(12) United States Patent
Mishra et al.

(10) Patent No.: US 11,506,834 B2
(45) Date of Patent: Nov. 22, 2022

(54) OPTICAL FIBER WITH DUAL TRENCH DESIGN

(71) Applicant: CORNING INCORPORATED, Corning, NY (US)

(72) Inventors: Snigdharaj Kumar Mishra, Wilmington, NC (US); Pushkar Tandon, Painted Post, NY (US)

(73) Assignee: Corning Incorporated, Corning, NY (US)

(*) Notice: Subject to any disclaimer, the term of this patent is extended or adjusted under 35 U.S.C. 154(b) by 0 days.

(21) Appl. No.: 17/319,167

(22) Filed: May 13, 2021

(65) Prior Publication Data

US 2021/0364690 A1  Nov. 25, 2021

Related U.S. Application Data

(60) Provisional application No. 63/028,164, filed on May 21, 2020.

(30) Foreign Application Priority Data

Jul. 3, 2020 (NL) ..................................... 2025984

(51) Int. Cl.
    *G02B 6/02* (2006.01)
    *G02B 6/028* (2006.01)
    *G02B 6/036* (2006.01)

(52) U.S. Cl.
    CPC ....... *G02B 6/02009* (2013.01); *G02B 6/0286* (2013.01); *G02B 6/02214* (2013.01); *G02B 6/03688* (2013.01)

(58) Field of Classification Search
    CPC ............ G02B 6/02009; G02B 6/02214; G02B 6/0286; G02B 6/03688
    (Continued)

(56) References Cited

U.S. PATENT DOCUMENTS 6,658,190 B2  12/2003  Hirano et al.
6,954,572 B2  10/2005  Moridaira et al.
(Continued)

FOREIGN PATENT DOCUMENTS

| DE | 102011052197 B4 | 8/2019 |
| WO | 2002/088803 A2 | 11/2002 |
| WO | 2019/032332 A1 | 2/2019 |

OTHER PUBLICATIONS

European Patent Application No. 21172798.7, Partial European Search Report dated Sep. 8, 2021; 14 pages; European Patent Office.
(Continued)

*Primary Examiner* — Jerry M Blevins
(74) *Attorney, Agent, or Firm* — Amy T. Lang

(57) ABSTRACT

A single mode optical fiber is provided that includes a core region having an outer radius $r_1$ and a maximum relative refractive index $\Delta 1_{max}$. The single mode optical fiber has a bend loss at 1550 nm for a 15 mm diameter mandrel of less than about 0.75 dB/turn, has a bend loss at 1550 nm for a 20 mm diameter mandrel of less than about 0.2 dB/turn, and a bend loss at 1550 nm for a 30 mm diameter mandrel of less than 0.002 dB/turn. Additionally, the single mode optical fiber has a mode field diameter of 9.0 microns or greater at 1310 nm wavelength and a cable cutoff of less than or equal to about 1260 nm.

18 Claims, 22 Drawing Sheets

(58) Field of Classification Search
USPC .......................................................... 385/124
See application file for complete search history.

(56) References Cited

U.S. PATENT DOCUMENTS

| | | |
|---|---|---|
| 8,020,411 B2 | 9/2011 | Moridaira et al. |
| 8,145,027 B2 | 3/2012 | Overton et al. |
| 8,385,705 B2 | 2/2013 | Overton et al. |
| 8,483,535 B2 | 7/2013 | Molin et al. |
| 8,798,423 B2 | 8/2014 | Sillard et al. |
| 9,798,079 B2 | 10/2017 | Bookbinder et al. |
| 9,851,501 B2 | 12/2017 | Bookbinder et al. |
| 10,048,438 B2 | 8/2018 | Bookbinder et al. |
| 10,082,622 B2 | 9/2018 | Bookbinder et al. |
| 10,564,349 B2 | 2/2020 | Bickham et al. |
| 10,620,393 B2 | 4/2020 | Bookbinder et al. |
| 2014/0308015 A1 | 10/2014 | Bookbinder et al. |
| 2016/0313502 A1* | 10/2016 | Bickham ............ G02B 6/03627 |
| 2019/0049681 A1* | 2/2019 | Bookbinder ......... G02B 6/4413 |
| 2019/0243063 A1* | 8/2019 | Bookbinder ......... G02B 6/0365 |
| 2019/0293887 A1 | 9/2019 | Bookbinder et al. |

OTHER PUBLICATIONS

Netherlands Search Report and Written Opinion of the Searching Authority; 2025984; dated Feb. 11, 2021; 13 pages; Netherlands Patent Office.

\* cited by examiner

OPTICAL FIBER WITH DUAL TRENCH DESIGN

This Applications claims priority to Dutch Patent Application No. 2025984 filed on Jul. 3, 2020, which claims priority from U.S. Provisional Patent Application Ser. No. 63/028,164 filed on May 21, 2020 which is incorporated by reference herein in its entirety.

FIELD OF THE DISCLOSURE

This disclosure pertains to optical fibers. More particularly, this disclosure pertains to optical fibers with reduced bend loss across all bend diameters and to optical fibers with a dual trench design.

BACKGROUND OF THE DISCLOSURE

Optical fibers having low bending loss are widely used in telecommunication systems, particularly in Fiber to the Premises (FTTP) applications, including Fiber to the Home (FTTH) and Fiber to the Building (FTTB) applications. Such applications generally require optical fibers with low bending loss of the optical signal transmitted therethrough, due to the strict installation constraints. For example, the optical fibers are drawn around tight corners in houses or buildings or experience radial compression that may adversely affect the performance or reliability of the optical fibers.

The ITU-T Recommendation G.657 is used as the standard for bending-loss insensitive single mode optical fibers, in which the bending loss is reduced compared to a standard ITU-T G.652 compliant single mode optical fiber.

SUMMARY

In order to be ITU-T G.657 compliant at across all bend diameters, traditional single mode optical fibers have small mode field diameters to provide the required bend-loss insensitivity. Typically, the small mode field diameters are between 8.5 microns and 8.8 microns at 1310 nm. However, such small mode field diameters impair connectivity of these optical fibers when the fibers are connected to a standard single mode optical fiber having nominal mode field diameter of about 9.2 microns at 1310 nm wavelength. Such adversely results in increased connectivity losses.

In order to have good bend insensitivity while reducing the connectivity losses, it is desirable to have a mode field diameter larger than or equal to 9 microns at 1310 nm wavelength and bend performance that is G.657 compliant for both smaller and larger bends. The optical fibers of the present disclosure that have a mode field diameter larger than or equal to 9 microns are G.657 compliant across all bend diameters. The embodiments of the present disclosure include optical fibers with a dual trench design to provide the G.657 compliant bend diameters for both smaller and larger bends while maintaining a mode field diameter of 9 microns or greater at 1310 nm wavelength.

In a first aspect, the present disclosure includes a single mode optical fiber comprising a core region having an outer radius $r_1$ and a maximum relative refractive index $\Delta 1_{max}$. The single mode optical fiber has a bend loss at 1550 nm for a 15 mm diameter mandrel of less than about 0.75 dB/turn, has a bend loss at 1550 nm for a 20 mm diameter mandrel of less than about 0.2 dB/turn, and a bend loss at 1550 nm for a 30 mm diameter mandrel of less than 0.002 dB/turn. Additionally, the single mode optical fiber has a mode field diameter of 9.0 microns or greater at 1310 nm wavelength and a cable cutoff of less than or equal to about 1260 nm.

In another aspect, the present disclosure includes a single mode optical fiber comprising a core region having an outer radius $r_1$ and a maximum relative refractive index $\Delta 1_{max}$ and a cladding region surrounding the core region. The cladding region comprising an inner cladding region having an outer radius $r_2$ and a relative refractive index $\Delta_2$; a first depressed-index cladding region surrounding the inner cladding region, the first depressed-index cladding region having an outer radius $r_3$, a minimum relative refractive index $\Delta 3_{min}$, and a trench volume $V_3$; an intermediate cladding region surrounding the first depressed-index cladding region, the intermediate cladding region having an outer radius $r_4$ and a relative refractive index $\Delta_4$; a second depressed-index cladding region surrounding the intermediate cladding region, the second depressed-index cladding region having an outer radius $r_5$, a minimum relative refractive index $\Delta 5_{min}$, and a trench volume $V_5$; and an outer cladding region surrounding the second depressed-index cladding region, the outer cladding region having a relative refractive index $\Delta_6$. The single mode optical fiber has a bend loss at 1550 nm for a 15 mm diameter mandrel of less than about 0.75 dB/turn, has a bend loss at 1550 nm for a 20 mm diameter mandrel of less than about 0.2 dB/turn, and a bend loss at 1550 nm for a 30 mm diameter mandrel of less than about 0.005 dB/turn. Additionally, the single mode optical fiber has a mode field diameter of 9.0 microns or greater at 1310 nm wavelength.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary and are intended to provide an overview or framework to understand the nature and character of the claims.

The accompanying drawings are included to provide a further understanding and are incorporated in and constitute a part of this specification. The drawings are illustrative of selected aspects of the present disclosure, and together with the description serve to explain principles and operation of methods, products, and compositions embraced by the present disclosure.

DETAILED DESCRIPTION

Figure 1:
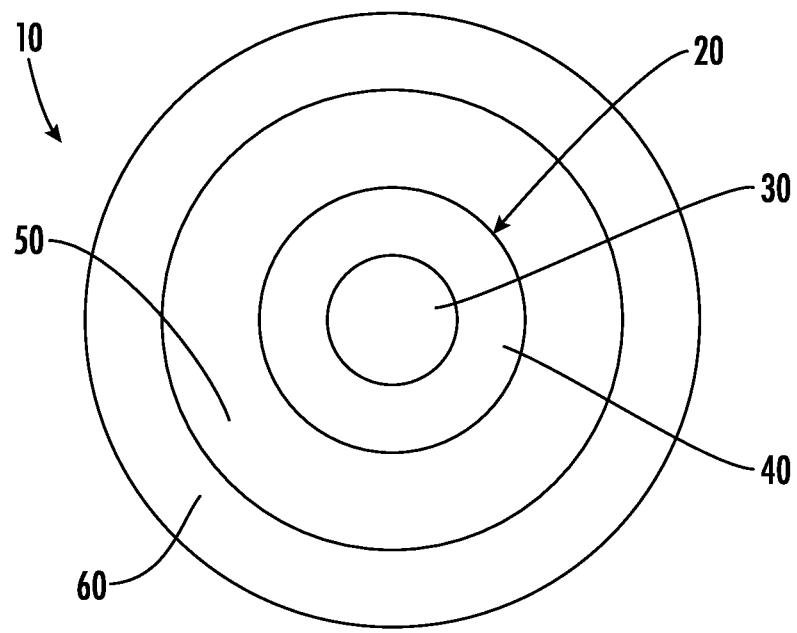
FIG. 1 is a schematic view of a cross-section of a coated optical fiber according to embodiments of the present disclosure.

The present disclosure is provided as an enabling teaching and can be understood more readily by reference to the following description, drawings, examples, and claims. To this end, those skilled in the relevant art will recognize and appreciate that many changes can be made to the various aspects of the embodiments described herein, while still obtaining the beneficial results. It will also be apparent that some of the desired benefits of the present embodiments can be obtained by selecting some of the features without utilizing other features. Accordingly, those who work in the art will recognize that many modifications and adaptations are possible and can even be desirable in certain circumstances and are a part of the present disclosure. Therefore, it is to be understood that this disclosure is not limited to the specific compositions, articles, devices, and methods disclosed unless otherwise specified. It is also to be understood that the terminology used herein is for the purposes of describing particular aspects only and is not intended to be limiting.

In this specification and in the claims which follow, reference will be made to a number of terms which shall be defined to have the following meanings:

"Optical fiber" refers to a waveguide having a glass portion surrounded by a coating. The glass portion includes a core and a cladding and is referred to herein as a "glass fiber".

"Radial position", "radius", or the radial coordinate "r" refers to radial position relative to the centerline (r=0) of the fiber.

"Refractive index" refers to the refractive index at a wavelength of 1550 nm, unless otherwise specified.

The "refractive index profile" is the relationship between refractive index or relative refractive index and radius. For relative refractive index profiles depicted herein as having step boundaries between adjacent core and/or cladding regions, normal variations in processing conditions may preclude obtaining sharp step boundaries at the interface of adjacent regions. It is to be understood that although boundaries of refractive index profiles may be depicted herein as step changes in refractive index, the boundaries in practice may be rounded or otherwise deviate from perfect step function characteristics. It is further understood that the value of the relative refractive index may vary with radial position within the core region and/or any of the cladding regions. When relative refractive index varies with radial position in a particular region of the fiber (e.g. core region and/or any of the cladding regions), it is expressed in terms of its actual or approximate functional dependence, or its value at a particular position within the region, or in terms of an average value applicable to the region as a whole. Unless otherwise specified, if the relative refractive index of a region (e.g. core region and/or any of the cladding regions) is expressed as a single value or as a parameter (e.g. $\Delta$ or $\Delta$ %) applicable to the region as a whole, it is understood that the relative refractive index in the region is constant, or approximately constant, and corresponds to the single value, or that the single value or parameter represents an average value of a non-constant relative refractive index dependence with radial position in the region. For example, if "i" is a region of the glass fiber, the parameter $\Delta_i$ refers to the average value of relative refractive index in the region as defined by Eq. (1) below, unless otherwise specified. Whether by design or a consequence of normal manufacturing variability, the dependence of relative refractive index on radial position may be sloped, curved, or otherwise non-constant.

"Relative refractive index," as used herein, is defined in Eq. (1) as:

$$\Delta_i(r_i)\% = 100 \frac{(n_i^2 - n_{ref}^2)}{2n_i^2} \tag{1}$$

where $n_i$ is the refractive index at radial position $r_i$ in the glass fiber, unless otherwise specified, and $n_{ref}$ is the refractive index of pure silica glass, unless otherwise specified. Accordingly, as used herein, the relative refractive index percent is relative to pure silica glass, which has a value of 1.444 at a wavelength of 1550 nm. As used herein, the relative refractive index is represented by $\Delta$ (or "delta") or $\Delta$ % (or "delta %") and its values are given in units of "%", unless otherwise specified. Relative refractive index may also be expressed as $\Delta(r)$ or $\Delta(r)$ %.

The average relative refractive index ($\Delta_{ave}$) of a region of the fiber is determined from Eq. (2):

$$\Delta_{ave} = \int_{r_{inner}}^{r_{outer}} \frac{\Delta(r) dr}{(r_{outer} - r_{inner})} \tag{2}$$

where $r_{inner}$ is the inner radius of the region, $r_{outer}$ is the outer radius of the region, and $\Delta(r)$ is the relative refractive index of the region.

The refractive index of an optical fiber profile may be measured using commercially available devices, such as the IFA-100 Fiber Index Profiler (Interfiber Analysis LLC, Sharon, Mass. USA) or the S14 Refractive Index Profiler (Photon Kinetics, Inc., Beaverton, Oreg. USA). These devices measure the refractive index relative to a measurement reference index, $n(r) - n_{meas}$, where the measurement reference index $n_{meas}$ is typically a calibrated index matching oil or pure silica glass. The measurement wavelength may be 632.5 nm, 654 nm, 677.2 nm, 654 nm, 702.3 nm, 729.6 nm, 759.2 nm, 791.3 nm, 826.3 nm, 864.1 nm, 905.2 nm, 949.6 nm, 997.7 nm, 1050 nm, or any wavelength therebetween. The absolute refractive index $n(r)$ is then used to calculate the relative refractive index as defined by Eq. (1).

The term "$\alpha$-profile" or "alpha profile" refers to a relative refractive index profile $\Delta(r)$ that has the functional form defined in Eq. (3):

$$\Delta(r) = \Delta(r_0)\left[1 - \left[\frac{|r - r_0|}{(r_z - r_0)}\right]^\alpha\right] \tag{3}$$

where $r_0$ is the radial position at which $\Delta(r)$ is maximum, $\Delta(r_0) > 0$, $r_z > r_0$ is the radial position at which $\Delta(r)$ decreases to its minimum value, and r is in the range $r_i \leq r \leq r_f$, where $r_i$ is the initial radial position of the $\alpha$-profile, $r_f$ is the final radial position of the $\alpha$-profile, and $\alpha$ is a real number. $\Delta(r_0)$ for an $\alpha$-profile may be referred to herein as $\Delta_{max}$ or, when referring to a specific region i of the fiber, as $\Delta_{imax}$. When the relative refractive index profile of the fiber core region is described by an $\alpha$-profile with $r_0$ occurring at the centerline (r=0), $r_z$ corresponding to the outer radius $r_1$ of the core region, and $\Delta_1(r_1)=0$, Eq. (3) simplifies to Eq. (4):

$$\Delta_1(r) = \Delta_{1max}\left[1 - \left[\frac{r}{r_1}\right]^\alpha\right] \quad (4)$$

Figure 5:
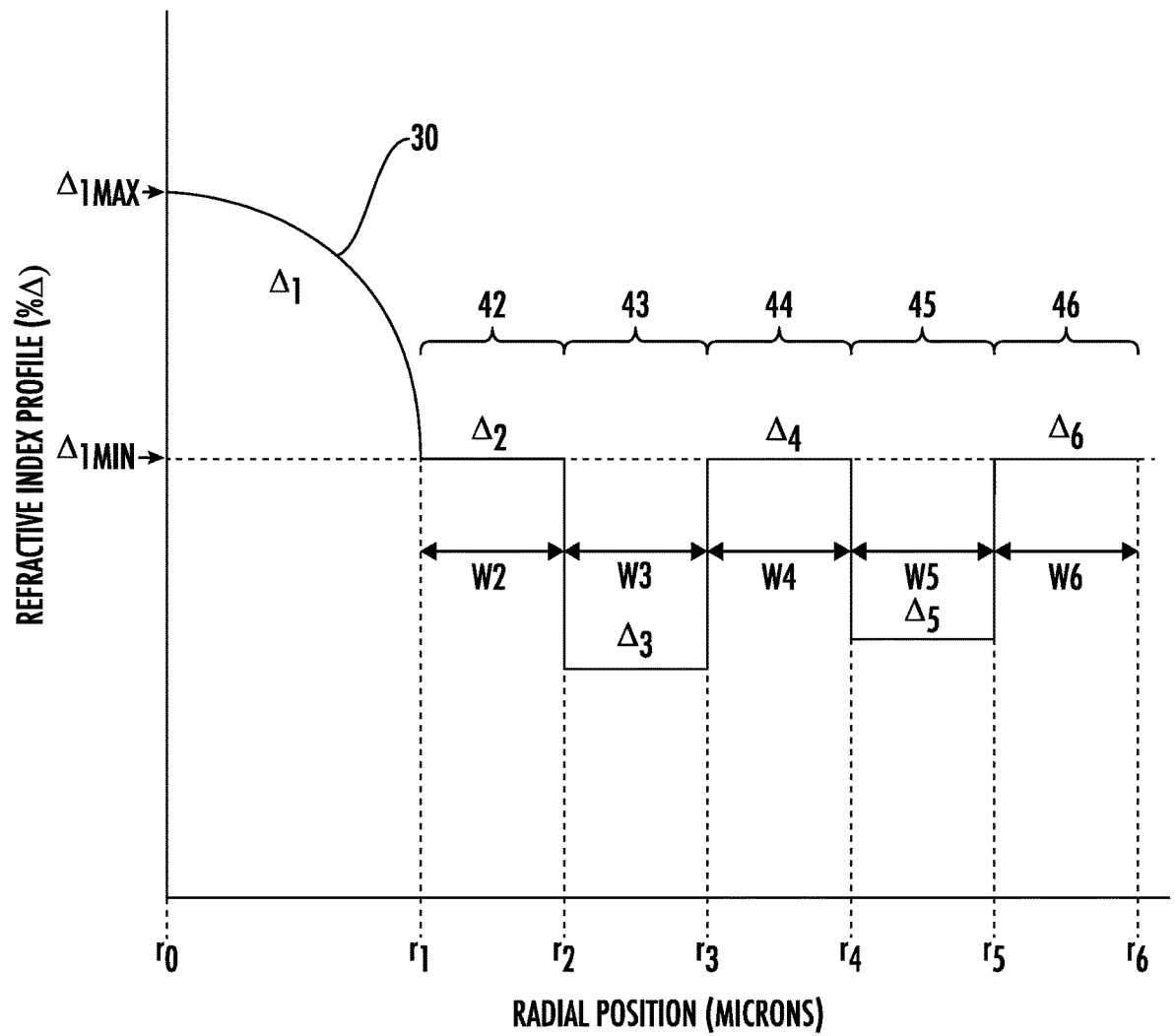
FIG. 5 depicts a relative refractive index profile of an optical fiber according to embodiments of the present disclosure.
Figure 6:
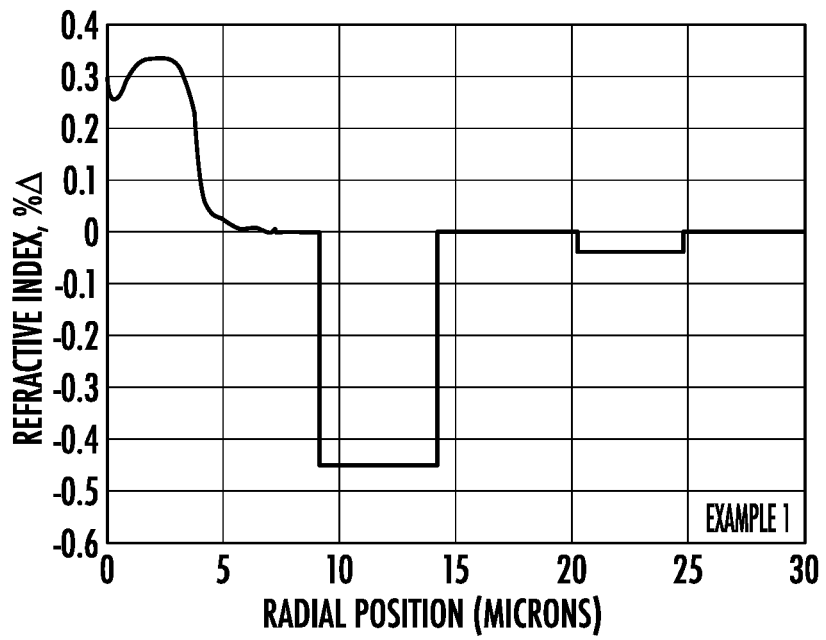
FIGS. 6-42 depict relative refractive index profiles of optical fibers according to exemplary embodiments of the present disclosure.
Figure 7:
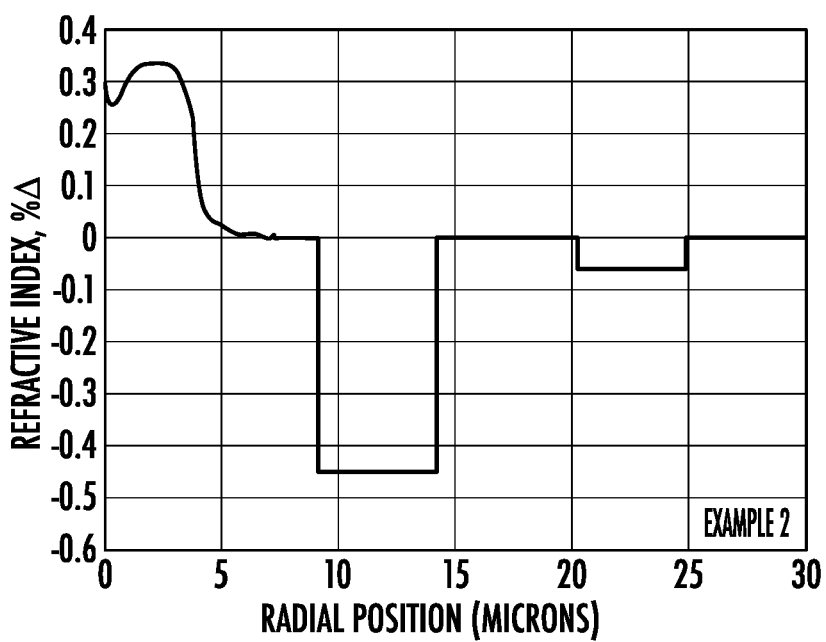
Figure 8:
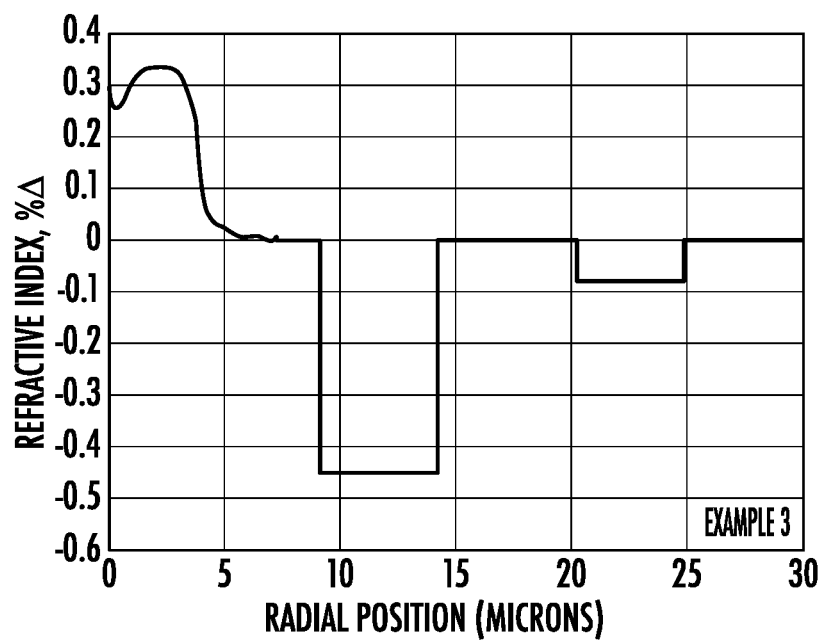
Figure 9:
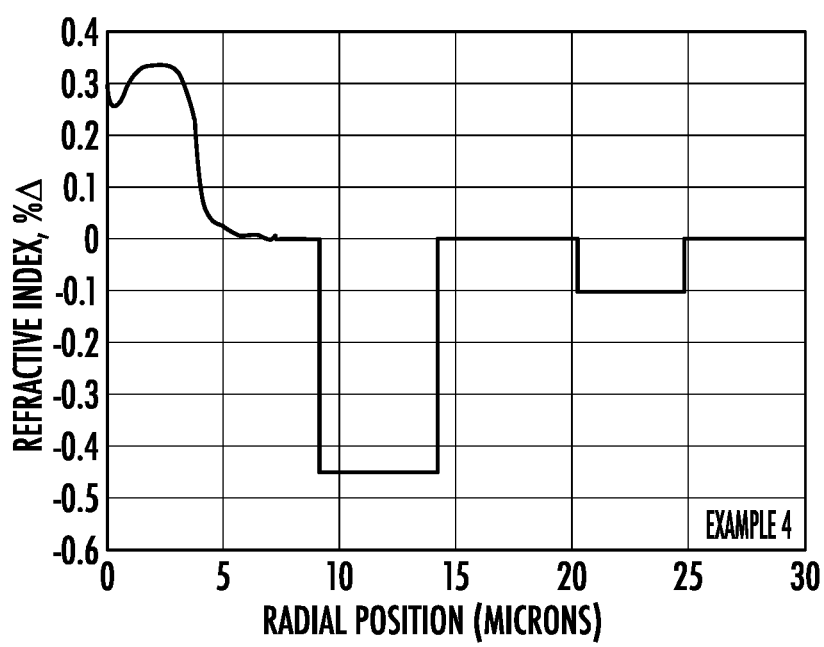

When the core region has an index described by Eq. (4), the outer radius $r_1$ can be determined from the measured relative refractive index profile by the following procedure. Estimated values of the maximum relative refractive index $\Delta_{1max}$, $\alpha$, and outer radius $r_{1est}$ are obtained from inspection of the measured relative refractive index profile and used to create a trial function $\Delta_{trial}$ between $r=-r_{1est}$ and $r=r_{1est}$. Relative refractive index profiles of representative glass fibers having cores described by an $\alpha$-profile, in accordance with embodiments of the present disclosure, are shown in FIGS. 5 and 6.

"Trench volume" is defined as:

$$V_{Trench} = \left| 2\int_{r_{Trench,inner}}^{r_{Trench,outer}} \Delta_{Trench}(r)r\,dr \right| \quad (5)$$

where $r_{Trench,inner}$ is the inner radius of the trench region of the refractive index profile, $r_{Trench,outer}$ is the outer radius of the trench region of the refractive index profile, $\Delta_{Trench}(r)$ is the relative refractive index of the trench region of the refractive index profile, and r is radial position in the fiber. Trench volume is in absolute value and a positive quantity and will be expressed herein in units of % $\Delta$micron$^2$, % $\Delta$-micron$^2$, % $\Delta$-$\mu$m$^2$, or % $\Delta\mu$m$^2$, whereby these units can be used interchangeably herein. A trench region is also referred to herein as a depressed-index cladding region and trench volume is also referred to herein as $V_3$.

The "mode field diameter" or "MFD" of an optical fiber is defined in Eq. (6) as:

$$MFD = 2w \quad (6)$$

$$w^2 = 2\frac{\int_0^\infty (f(r))^2 r\,dr}{\int_0^\infty \left(\frac{df(r)}{dr}\right)^2 r\,dr}$$

where f(r) is the transverse component of the electric field distribution of the guided optical signal and r is radial position in the fiber. "Mode field diameter" or "MFD" depends on the wavelength of the optical signal and is reported herein for wavelengths of 1310 nm, 1550 nm, and 1625 nm. Specific indication of the wavelength will be made when referring to mode field diameter herein. Unless otherwise specified, mode field diameter refers to the $LP_{01}$ mode at the specified wavelength.

"Effective area" of an optical fiber is defined in Eq. (7) as:

$$A_{eff} = \frac{2\pi\left[\int_0^\infty (f(r))^2 r\,dr\right]^2}{\int_0^\infty (f(r))^4 r\,dr} \quad (7)$$

where f(r) is the transverse component of the electric field of the guided optical signal and r is radial position in the fiber. "Effective area" or "$A_{eff}$" depends on the wavelength of the optical signal and is understood herein to refer to a wavelength of 1550 nm.

The term "attenuation," as used herein, is the loss of optical power as the signal travels along the optical fiber. Attenuation was measured as specified by the IEC-60793-1-40 standard, "Attenuation measurement methods."

The bend resistance of an optical fiber, expressed as "bend loss" herein, can be gauged by induced attenuation under prescribed test conditions as specified by the IEC-60793-1-47 standard, "Measurement methods and test procedures—Macrobending loss." For example, the test condition can entail deploying or wrapping the fiber one or more turns around a mandrel of a prescribed diameter, e.g., by wrapping 1 turn around either a 15 mm, 20 mm, or 30 mm or similar diameter mandrel (e.g. "1×15 mm diameter bend loss" or the "1×20 mm diameter bend loss" or the "1×30 mm diameter bend loss") and measuring the increase in attenuation per turn.

"Cable cutoff wavelength," or "cable cutoff," as used herein, refers to the 22 m cable cutoff test as specified by the IEC 60793-1-44 standard, "Measurement methods and test procedures—Cut-off wavelength."

The optical fibers disclosed herein include a core region, a cladding region surrounding the core region, and a coating surrounding the cladding region. The core region and cladding region are glass. The cladding region includes multiple regions. The multiple cladding regions are preferably concentric regions. The cladding region includes an inner cladding region, a first depressed-index cladding region, an intermediate cladding region, a second depressed-index cladding region, and an outer cladding region. The inner cladding region surrounds and is directly adjacent to the core region. The first depressed-index cladding region surrounds and is directly adjacent to the inner cladding region such that the first depressed-index cladding region is disposed between the inner cladding region and the intermediate cladding region in a radial direction. The intermediate cladding region surrounds and is directly adjacent to the first depressed-index cladding region such that the intermediate cladding region is disposed between the first depressed-index cladding region and the second depressed-index cladding region in a radial direction. The second depressed-index cladding region surrounds and is directly adjacent to the intermediate cladding region such that the second depressed-index cladding region is disposed between the intermediate cladding region and the outer cladding region in a radial direction. The outer cladding region surrounds and is directly adjacent to the second depressed-index cladding region.

The first and second depressed-index cladding regions each have a lower relative refractive index than the inner cladding region, the intermediate cladding region, and the outer cladding region. The relative refractive index of the inner cladding region may be less than, equal to, or greater than the relative refractive index of the intermediate cladding region and of the outer cladding region.

The first and second depressed-index claddings region may each be referred to herein as a trench or trench region. The embodiments of the present disclosure also disclose a dual trench design because the refractive index profiles of the optical fibers include both the first and second depressed-index cladding regions. These depressed-index cladding regions contribute to a reduction in bending losses and microbending sensitivity.

Whenever used herein, radial position $r_1$ and relative refractive index $\Delta_1$ or $\Delta_1(r)$ refer to the core region, radial position $r_2$ and relative refractive index $\Delta_2$ or $\Delta_2(r)$ refer to the inner cladding region, radial position $r_3$ and relative refractive index $\Delta_3$ or $\Delta_3(r)$ refer to the first depressed-index cladding region, radial position $r_4$ and relative refractive index $\Delta_4$ or $\Delta_4(r)$ refer to the intermediate cladding region, radial position $r_5$ and relative refractive index $\Delta_5(r)$ refer to the second depressed-index cladding region, and radial position $r_6$ and relative refractive index $\Delta_6(r)$ refer to the outer cladding region. Additionally, a radial position $r_7$ (not shown) refers to a primary coating, radial position $r_8$ (not shown) refers to a secondary coating, and the radial position $r_9$ (not shown) refers to an optional tertiary coating.

The relative refractive index $\Delta_1(r)$ has a maximum value $\Delta_{1max}$ and a minimum value $\Delta_{1min}$. The relative refractive index $\Delta_2(r)$ has a maximum value $\Delta_{2max}$ and a minimum value $\Delta_{2min}$. The relative refractive index $\Delta_3(r)$ has a maximum value $\Delta_{3max}$ and a minimum value $\Delta_{3min}$. The relative refractive index $\Delta_4(r)$ has a maximum value $\Delta_{4max}$ and a minimum value $\Delta_{4min}$. The relative refractive index $\Delta_5(r)$ has a maximum value $\Delta_{5max}$ and a minimum value $\Delta_{5min}$. The relative refractive index $\Delta_6(r)$ has a maximum value $\Delta_{6max}$ and a minimum value $\Delta_{6min}$. In embodiments in which the relative refractive index is constant or approximately constant over a region, the maximum and minimum values of the relative refractive index are equal or approximately equal. Unless otherwise specified, if a single value is reported for the relative refractive index of a region, the single value corresponds to an average value for the region.

It is understood that the central core region is substantially cylindrical in shape and that the surrounding inner cladding region, depressed-index cladding regions, intermediate cladding region, outer cladding region, primary coating, and secondary coating are substantially annular in shape. Annular regions are characterized in terms of an inner radius and an outer radius. Radial positions $r_1$, $r_2$, $r_3$, $r_4$, $r_5$, $r_6$, $r_7$, $r_8$, $r_9$, refer herein to the outermost radii of the core region, inner cladding region, first depressed-index cladding region, intermediate cladding region, second depressed-index cladding region, outer cladding region, primary coating, secondary coating, and tertiary coating, respectively. The radius $r_8$ also corresponds to the outer radius of the optical fiber in embodiments without a tertiary coating. When a tertiary coating is present, the radius $r_9$ corresponds to the outer radius of the optical fiber.

The difference between radial position $r_2$ and radial position $r_1$ is the thickness of the inner cladding region. The difference between radial position $r_3$ and radial position $r_2$ is the thickness of the first depressed-index cladding region. The difference between radial position $r_4$ and radial position $r_3$ is the thickness of the intermediate cladding region. The difference between radial position $r_5$ and radial position $r_4$ is the thickness of the second depressed-index cladding region. The difference between radial position $r_6$ and radial position $r_5$ is the thickness of the outer cladding region. The difference between radial position $r_7$ and radial position $r_6$ is the thickness of the primary coating. The difference between radial position $r_8$ and radial position $r_7$ is the thickness of the secondary coating.

Reference will now be made in detail to illustrative embodiments of the present description.

One embodiment relates to an optical fiber. The optical fiber includes a glass fiber surrounded by a coating. An example of an optical fiber is shown in schematic cross-sectional view in FIG. 1. Optical fiber 10 includes glass fiber 20 surrounded by primary coating 50 and secondary coating 60. Glass fiber 20 includes a core region 30 and a cladding region 40. In some embodiments, secondary coating 60 may include a pigment. Further description of glass fiber 20, primary coating 50, and secondary coating 60 is provided below. Additionally, one or more tertiary ink layers may surround secondary coating 60.

Figure 2:
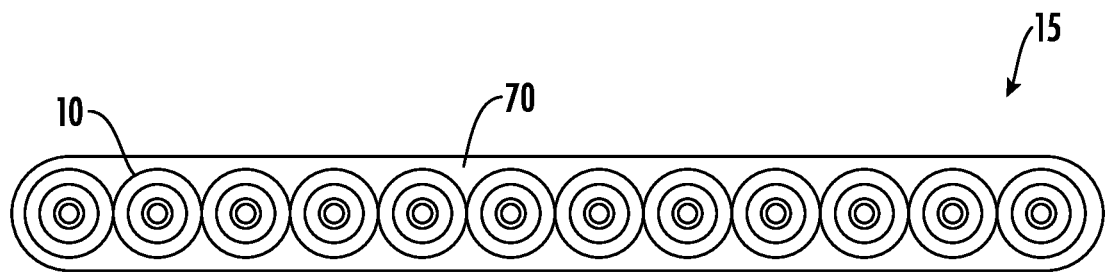
FIG. 2 is a schematic view of a cross-section of an optical fiber ribbon according to embodiments of the present disclosure.

FIG. 2 illustrates an optical fiber ribbon 15, which may include a plurality of optical fibers 10 and a matrix 70 encapsulating the plurality of optical fibers. As shown in FIG. 2, optical fibers 10 are aligned relative to one another in a substantially planar and parallel relationship. The optical fibers in fiber optic ribbon 15 are encapsulated by the matrix 70 in any of several known configurations (e.g., edge-bonded ribbon, thin-encapsulated ribbon, thick-encapsulated ribbon, or multi-layer ribbon) by conventional methods of making fiber optic ribbons. Fiber optic ribbon 15 in the embodiment of FIG. 2 contains twelve (12) optical fibers 10. However, it is contemplated that any number of optical fibers 10 (e.g., two or more) may be employed to form fiber optic ribbon 70 for a particular use. Matrix 70 has tensile properties similar to the tensile properties of a secondary coating and can be formed from the same, similar, or different composition used to prepare a secondary coating.

Figure 3:
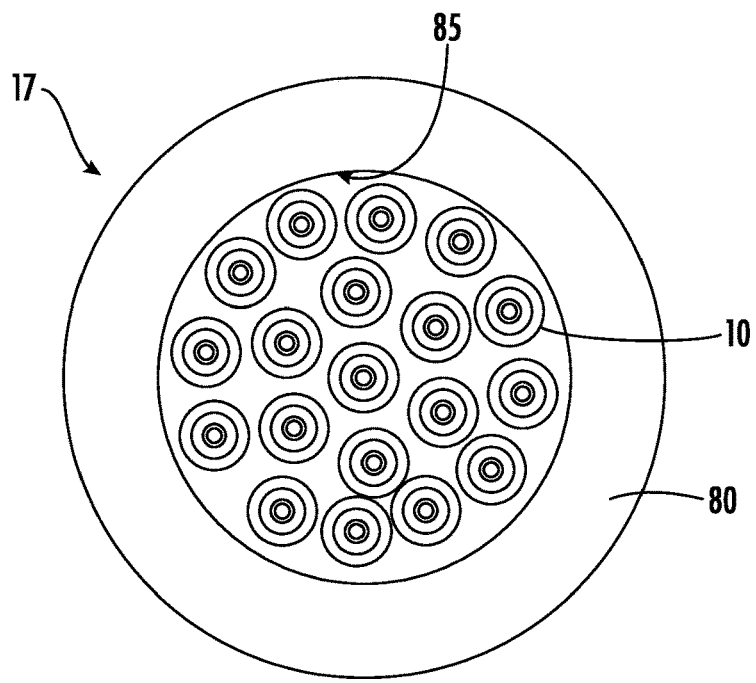
FIG. 3 is a schematic view of a cross-section of an optical fiber cable according to embodiments of the present disclosure.

FIG. 3 illustrates an optical fiber cable 17 that includes a plurality of optical fibers 10 surrounded by a jacket 80. Fibers 10 may be densely or loosely packed into a conduit enclosed by an inner surface 85 of jacket 80. The number of fibers placed in jacket 42 is referred to as the "fiber count" of optical fiber cable 40.

Jacket 80 is formed from an extruded polymer material and may include multiple concentric layers of polymers or other materials. Optical fiber cable 17 may include one or more strengthening members (not shown) embedded within jacket 80 or placed within the conduit defined by inner surface 85. Strengthening members include fibers or rods that are more rigid than jacket 80. The strengthening member may be made from metal, braided steel, glass-reinforced plastic, fiber glass, or other suitable material. Optical fiber cable 17 may include other layers surrounded by jacket 80 such as, for example, armor layers, moisture barrier layers, rip cords, etc. Furthermore, optical fiber cable 40 may have a stranded, loose tube core or other fiber optic cable construction.

As discussed above with reference to FIG. 1, glass fiber 20 includes core region 30 and cladding region 40. Core region 30 has a higher refractive index than cladding region 40, and glass fiber 20 functions as a waveguide. In many applications, core region 30 and cladding region 40 have a discernible core-cladding boundary. Alternatively, core region 30 and cladding region 40 can lack a distinct boundary.

Figure 4:
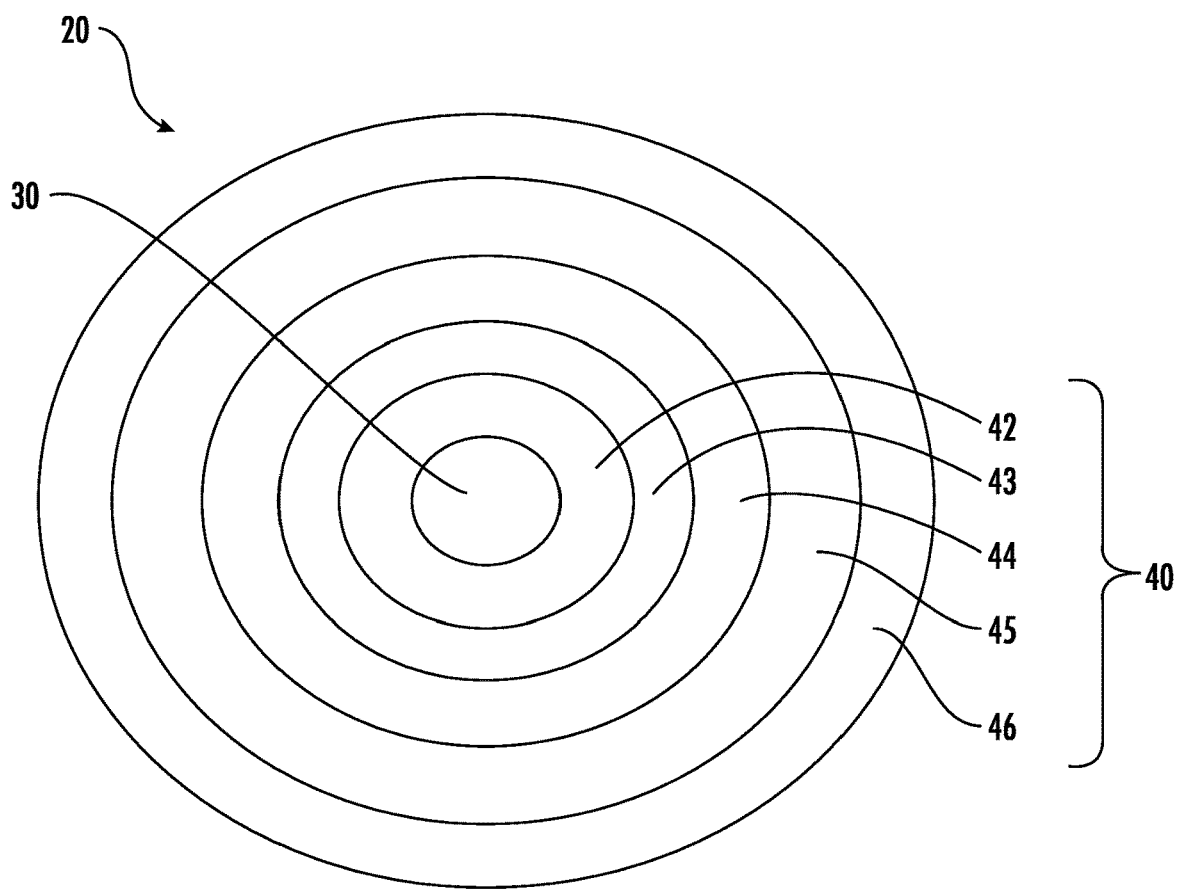
FIG. 4 is a schematic view of a cross-section of an optical fiber according to embodiments of the present disclosure.

A schematic cross-sectional depiction of an exemplary glass fiber 20 is shown in FIG. 4. In FIG. 4, cladding region 40 includes inner cladding region 42, first depressed-index cladding region 43, intermediate cladding region 44, second depressed-index cladding region 45, and outer cladding region 46.

FIG. 5 plots an idealized relative refractive index profile of glass fiber 20 as the relative refractive index $\Delta$ versus the radial coordinate r. Core region 30 has relative refractive index $\Delta 1(r)$, with a maximum refractive index of $\Delta_0 = \Delta 1_{MAX}$ at r=0 and a gradient $\alpha$-profile, which is described in greater detail below. Inner cladding region 42 has a relative refractive index $\Delta 2$ and a width W2. First depressed-index cladding region 43 can be in the form of a depressed region or a trench and has a width W3 and a relative refractive index $\Delta 3$, with a minimum value $\Delta 3_{MIN}$. Intermediate cladding region 44 has a relative refractive index $\Delta 4$ and a width W4. Second depressed-index cladding region 45 can be in the form of a depressed region or a trench and has a width W5 and a relative refractive index $\Delta 5$, with a minimum value $\Delta 5_{MIN}$. Outer cladding region 46 has a width W6 and relative refractive index $\Delta 6$, which is shown by way of example as $\Delta 6 = \Delta 4 = \Delta 2$. Furthermore, as shown by way of example, $\Delta 3 < \Delta 2$, $\Delta 3 < \Delta 4$, $\Delta 3 < \Delta 6$, and $\Delta 5 < \Delta 2$, $\Delta 5 < \Delta 4$, $\Delta 5 < \Delta 6$. Other configurations for the relative refractive index profile are discussed further below.

Core Region

Core region 30 comprises silica glass that is either undoped silica glass, up-doped silica glass, and/or down-doped silica glass. Up-doped silica glass includes silica glass doped with, for example, germanium (e.g., $GeO_2$), phosphorus (e.g., $P_2O_5$), aluminum (e.g. $Al_2O_3$), chlorine, or an alkali metal oxide (e.g. $Na_2O$, $K_2O$, $Li_2O$, $Cs_2O$, or $Rb_2O$). In some embodiments, the core comprises germania doped glass having a germania concentration between about 5 wt % and about 10 wt %. In embodiments where the core is doped with alkali dopant, the peak concentration of the alkali in the silica glass may range from about 10 ppm to about 500 ppm, or from about 30 ppm to about 400 ppm. In some embodiments, the silica glass of core region 30 is free of germanium and/or chlorine; that is the core region comprises silica glass that lacks germanium and/or chlorine.

Down-doped silica glass includes silica glass doped with, for example, fluorine or boron.

As discussed above, the relative refractive index of core region 30 of glass fiber 20 is described by an α-profile with an α value that is in a range of about 7.0 or less, or about 6.0 or less, or about 5.0 or less, or about 4.0 or less, or about 3.0 or less, or about 2.0 or less, or about 1.0 or less. In some other embodiments, the α value is about 8.0 or greater, or about 9.0 or greater, or about 10.0 or greater, or about 11.0 or greater, or about 12.0 or greater, or about 13.0 or greater. In some embodiments, the core a value is less than 100, or less than 50, or less than 20. In some embodiments, the α value is about 2.0, about 2.2, about 2.4, about 3.0, about 3.2, about 4.4, about 10.0, about 12.0, about 12.2, about 12.4, or about 20.

The outer radius $r_1$ of core region 30 is in a range from about 3.0 microns to about 7.0 microns, or about 3.5 microns to about 6.5 microns, or about 4.0 microns to about 5.0 microns, or about 4.3 microns to about 5.7 microns. In some embodiments, the outer radius $r_1$ is about 4.2 microns, or about 4.3 microns, or about 4.4 microns, or about 4.5 microns, or about 5.3 microns, or about 5.4 microns, or about 5.5 microns, or about 5.6 microns.

The maximum relative refractive index $\Delta_0$ or $\Delta_{1max}$ of core region 30 is in a range from about 0.50% or less, or about 0.40% or less, or about 0.39% or less, or about 0.38% or less, or about 0.37% or less, or about 0.36% or less, or about 0.35% or less, or about 0.34% or less, or about 0.33% or less, or about 0.32% or less, or about 0.31% or less, or about 0.30% or less, or about 0.28% or less, or about 0.25% or less. Additionally or alternatively, the maximum relative refractive index $\Delta_0$ or $\Delta_{max}$ of core region 30 is about 0.10% or greater, or about 0.15% or greater, or about 0.20% or greater, or about 0.25% or greater, or about 0.30% or greater. In some embodiments, the maximum relative refractive index $\Delta_0$ or $\Delta_{1max}$ is about 0.32%, or about 0.34%, or about 0.35%, or about 0.37%, or about 0.38%.

Although not depicted in FIG. 5, in some embodiments, the relative refractive index of core region 30 may have a centerline dip such that the maximum refractive index of core region 30 and the maximum refractive index of the entire optical fiber 10 is located a small distance away from the centerline of core region 30 rather than at the centerline of core region 30, as depicted in FIG. 5.

Inner Cladding Region

Inner cladding region 42 may be comprised of undoped silica glass. The inner radius of inner cladding region 42 is $r_1$, as discussed above. The outer radius $r_2$ of inner cladding region 42 is in a range from about 6.5 microns to about 15.0 microns, or about 7.0 microns to about 14.0 microns, or about 7.5 microns to about 13.5 microns, or about 8.0 microns to about 12.0 microns, or about 9.0 microns to about 11.0 microns. In some embodiments, the outer radius $r_2$ is about 7.2 microns, or about 7.5 microns, or about 8.9 microns, or about 9.1 microns, or about 10.0 microns, or about 10.6 microns, or about 11.5 microns, or about 11.7 microns, or about 14.0 microns.

The relative refractive index $\Delta_2$ of inner cladding region 42 is in a range from about −0.20% to about 0.20%, or in a range from about −0.15% to about 0.15%, or in a range from about −0.10% to about 0.10%, or in a range from about −0.05% to about 0.05%. In some embodiments, the relative refractive index $\Delta_2$ is about 0.0%. The relative refractive index $\Delta_2$ is preferably constant or approximately constant.

First Depressed-Index Cladding Region

First depressed-index cladding region 43 comprises down-doped silica glass. In some embodiments, first depressed-index cladding region 43 is down-doped with fluorine or boron. However, the down-doping of first depressed-index cladding region 43 can also be accomplished by incorporating voids in silica glass.

The inner radius of first depressed-index cladding region 43 is $r_2$, as discussed above. The outer radius $r_3$ of first depressed-index cladding region 43 is in a range of about 13.0 microns to about 23.0 microns, or about 13.5 microns to about 22.0 microns, or about 14.0 microns to about 21.0 microns, or about 14.5 microns to about 20.0 microns, or about 15.0 microns to about 19.0 microns, or about 15.5 microns to about 18.5 microns. In some embodiments, the outer radius $r_3$ is about 14.2 microns, or about 14.6 microns, or about 15.9 microns, or about 15.6 microns, or about 17.0 microns, or about 17.1 microns, or about 18.0 microns, or about 20.0 microns.

In some embodiments, first depressed-index cladding region 43 is a depressed-index cladding region that forms a trench design. The trench design may be an offset trench. The relative refractive index $\Delta_3$ of first-depressed index cladding region 43 is in a range from about −0.10% to about −0.60%, or about −0.15% to about −0.55%, or about −0.20% to about −0.50%, or about −0.25% to about −0.45%, or about −0.30% to about −0.40%. In some embodiments, the relative refractive index $\Delta 3$ of first-depressed index cladding region 43 is about −0.10%, or about −0.20%, or about-0.25%, or about −0.30%, or about −0.45%, or about −0.50%, or about −0.55%.

The transition regions from inner cladding region 42 to first depressed-index cladding region 43 and from first depressed-index cladding region 43 to intermediate cladding region 44 are shown as step changes in FIG. 5. However, it is to be understood that a step change is an idealization and that transition regions may not be strictly vertical in practice. Instead, the transition regions may have a slope or curvature.

A "volume" $V_3$ of first depressed-index cladding 43 region is defined in Eq. (8) as:

$$V_3 = 2\int_{r_2}^{r_3} \Delta_{3-6} r \, dr \qquad (8)$$

where $\Delta_{3-6} = (\Delta_3(r) - \Delta_6)$.

The trench volume $V_3$ of first depressed-index cladding region 43 may be about 5.0% $\Delta$-micron$^2$ to about 70.0% $\Delta$-micron$^2$, or about 30.0% $\Delta$-micron$^2$ to about 70.0% $\Delta$-micron$^2$, or about 40.0% $\Delta$-micron$^2$ to about 60.0% $\Delta$-micron$^2$, or about 50.0% $\Delta$-micron$^2$ to about 55.0% $\Delta$-micron$^2$. In some embodiments, the trench volume $V_3$ is about 5.5% Δ-micron², or about 8.7% Δ-micron², or about 15.1% Δ-micron², or about 20.1% Δ-micron², or about 25.7% Δ-micron², or about 27.7% Δ-micron², or about 50.5% Δ-micron², or about 50.8% Δ-micron², or about 50.9% Δ-micron² or about 51.0% Δ-micron², or about 53.1% Δ-micron², or about 54.2% Δ-micron², or about 56.9% Δ-micron², or about 57.0% Δ-micron².

A center of mass of the radial position of first depressed-index cladding region 43 is defined in Eq. (9) as:

$$r_{3,CM} = \frac{\int_{r2}^{r3} \Delta_{3-6} r^2 dr}{\int_{r2}^{r3} \Delta_{3-6} r\, dr} \tag{9}$$

The center of mass of the radial position of first depressed-index cladding region 43 is in a range between about 6.0 microns and about 20.0 microns, or about 7.0 microns and about 18.0 microns, or about 8.0 microns and about 17.0 microns, or about 10.0 microns and about 15.0 microns, or about 11.0 microns and about 14.0 microns, or about 12.0 microns and about 13.0 microns. In some embodiments, the center of mass of the radial position of first depressed-index cladding region 43 is 11.9 microns, or 12.7 microns, or 13.3 microns.

As also discussed further below, first depressed-index cladding region 43 may have either a rectangular or triangular profile.

Intermediate Cladding Region

Intermediate cladding region 44 may be comprised of undoped silica glass. The inner radius of intermediate cladding region 44 is $r_3$, as discussed above. The outer radius $r_4$ of intermediate cladding region 44 is in a range from about 15.0 microns to about 26.0 microns, or about 16.0 microns to about 25.0 microns, or about 17.0 microns to about 22.0 microns, or about 18.0 microns to 21.0 microns. In some embodiments, outer radius $r_4$ of intermediate cladding region 44 is about 17.0 microns, or about 17.5 microns, or about 18.0 microns, or about 18.2 microns, or about 18.5 microns, or about 20.0 microns, or about 20.2 microns, or about 20.5 microns.

The relative refractive index $\Delta_4$ of intermediate cladding region 44 is in a range from about −0.20% to about 0.20%, or in a range from about −0.15% to about 0.15%, or in a range from about −0.10% to about 0.10%, or in a range from about −0.05% to about 0.05%. In some embodiments, the relative refractive index $\Delta_4$ is about 0.0%. The relative refractive index $\Delta_4$ is preferably constant or approximately constant. Furthermore, is some embodiments, the relative refractive index $\Delta_4$ is equal to or substantially equal to the relative refractive index Δ2.

Second Depressed-Index Cladding Region

Second depressed-index cladding region 45 comprises down-doped silica glass. In some embodiments, second depressed-index cladding region 45 is down-doped with fluorine or boron. The down-dopant of second depressed-index cladding region 45 may be the same or different from the down-dopant of first depressed-index cladding region 43.

The inner radius of second depressed-index cladding region 45 is $r_4$, as discussed above. The outer radius $r_5$ of second depressed-index cladding region 45 is in a range of about 16.0 microns to about 30.0 microns, or about 17.0 microns to about 28.0 microns, or about 18.0 microns to about 26.0 microns, or about 19.0 microns to about 25.0 microns. In some embodiments, the outer radius $r_4$ is about 17.0 microns, or about 17.4 microns, or about 18.0 microns, or about 20.0 microns, or about 24.4 microns or about 24.6 microns, or about 24.8 microns, or about 24.9 microns, or about 25.0 microns, or about 25.3 microns, or about 25.4 microns.

In some embodiments, second depressed-index cladding region 45 is a depressed-index cladding region that forms a trench design. The trench design may be an offset trench. The relative refractive index $\Delta_5$ of second-depressed index cladding region 45 is in a range from about −0.004% to about −0.350%, or about −0.008% to about −0.300%, or about −0.020% to about −0.250%, or about −0.020% to about −0.200%, or about −0.060% to about −0.200%, or about −0.080% to about −0.150%, or about −0.100% to about −0.125%. In some embodiments, the relative refractive index $\Delta_5$ of second depressed-index cladding region 45 is about −0.020%, or about −0.040%, or about −0.060%, or about −0.072%, or about −0.080%, or about −0.100%, or about −0.1100%, or about −0.120%, or about −0.180%, or about −0.145%, or about −0.200%, or about −0.250%, or about −0.300%.

The transition regions from intermediate cladding region 44 to second depressed-index cladding region 45 and from second depressed-index cladding region 45 to outer cladding region 46 are shown as step changes in FIG. 5. However, it is to be understood that a step change is an idealization and that transition regions may not be strictly vertical in practice. Instead, the transition regions may have a slope or curvature.

A "volume" $V_5$ of second depressed-index cladding region 45 is defined in Eq. (10) as:

$$V_5 = 2\int_{r4}^{r5} \Delta_{5-6} r\, dr \tag{10}$$

where $\Delta_{3-6} = (\Delta_3(r) - \Delta_6)$.

The trench volume $V_5$ of second depressed-index cladding region 45 may be about 0.10% Δ-micron² to about 50.0% Δ-micron², or from about 0.5% Δ-micron² to about 40.0% Δ-micron², or from about 1.0% Δ-micron² to about 30.0% Δ-micron², or from about 5.0% Δ-micron² to about 25.0% Δ-micron², or from about 8.0% Δ-micron² to about 23.0% Δ-micron². In some embodiments, the trench volume $V_5$ is about 10.0% Δ-micron² or less, or about 8.0% Δ-micron² or less, or about 5.0% Δ-micron² or less, or about 2.5% Δ-micron² or less, or about 2.0% Δ-micron² or less, or about 1.0% Δ-micron² or less, or about 0.75% Δ-micron² or less, or about 0.5% Δ-micron² or less, or about 0.25% Δ-micron² or less, or about 0.2% Δ-micron² or less, or about 0.1% Δ-micron² or less. In some exemplary embodiments, the trench volume $V_5$ is about 7.74% Δ-micron², or about 8.22% Δ-micron², or about 8.48% Δ-micron², or about 11.82% Δ-micron², or about 12.32% Δ-micron², or about 12.72% Δ-micron², or about 13.83% Δ-micron², or about 15.58% Δ-micron², or about 16.43% Δ-micron², or about 16.96% Δ-micron², or about 18.43% Δ-micron², or about 19.34% Δ-micron², or about 20.54% Δ-micron², or about 21.20% Δ-micron², or about 21.70% Δ-micron², or about 23.04% Δ-micron², or about 25.44% Δ-micron².

A center of mass of the radial position of second depressed-index cladding region 45 is defined in Eq. (11) as:

$$r_{3,CM} = \frac{\int_{r4}^{r5} \Delta_{5-6} r^2 dr}{\int_{r4}^{r5} \Delta_{5-6} r\, dr} \tag{11}$$

The center of mass of the radial position of second depressed-index cladding region 45 is in a range between about 15.0 microns and about 35.0 microns, or about 15.5 microns and about 32.0 microns, or about 16.0 microns and about 30.0 microns, or about 18.0 microns and about 28.0 microns, or about 20.0 microns and about 25.0 microns, or about 21.0 microns and about 24.0 microns, or about 16.0 microns and about 18.0 microns. In some embodiments, the center of mass of the radial position of second depressed-index cladding region 45 is about 22.6 microns, or about 22.9 microns, or about 23.3 microns.

A ratio of the center of mass of the radial position of first depressed-index cladding region 43 to second depressed-index cladding 45 is in a range from about 0.25 to about 0.75, or about 0.30 to about 0.70, or about 0.35 to about 0.65, or about 0.40 to about 0.60. In some embodiments, the ratio is about 0.52, or about 0.53, or about 0.54, or about 0.56, or about 0.57, or about 0.59.

As also discussed further below, second depressed-index cladding region 45 may have either a rectangular or triangular profile.

Outer Cladding Region

Outer cladding region 46 may be comprised of undoped silica glass. The inner radius of outer cladding region 46 is $r_5$, as discussed above. The outer radius $r_6$ of outer cladding region 46 is in a range from about 40.0 microns to about 65 microns, or from about 45.0 microns to about 62.5 microns, or from about 50.0 microns to about 60.0 microns, or from about 52.5 microns to about 57.5 microns. In some embodiments, the outer radius $r_6$ of outer cladding region 46 is about 62.5 microns.

The relative refractive index $\Delta_6$ of inner cladding region 42 is in a range from about −0.20% to about 0.20%, or in a range from about −0.15% to about 0.15%, or in a range from about −0.10% to about 0.10%, or in a range from about −0.05% to about 0.05%. In some embodiments, the relative refractive index $\Delta_6$ is about 0.0%. The relative refractive index $\Delta_6$ is preferably constant or approximately constant. Furthermore, is some embodiments, the relative refractive index $\Delta_6$ is equal to or substantially equal to the relative refractive index $\Delta_2$ and/or the relative refractive index $\Delta_4$.

Trench Designs

As discussed above, first and second depressed-index cladding regions 43, 45 can have either a rectangular or a triangular profile. In some embodiments, both depressed-index cladding regions 43, 45 have a rectangular profile. In other embodiments, both depressed-index cladding regions 43, 45 have a triangular profile. In yet other embodiments, at least one of the depressed index-cladding regions 43, 45 has a rectangular profile and at least one has a triangular profile. The triangular shape of either first depressed-index cladding region 43 and/or second depressed-index cladding region 45 may be such that the refractive index decreases with increasing radial position. Therefore, the trench volume of the triangular trenches increases with increasing radial position.

In some embodiments, the volume $V_3$ of first depressed-index cladding region 43 is greater than the volume $V_5$ of second depressed-index cladding region 45. For example, a ratio $V_5/V_3$ is less than 1.0, or about 0.9 or less, or about 0.8 or less, or about 0.7 or less, or about 0.6 or less, or about 0.5 or less, or about 0.4 or less, or about 0.3 or less, or about 0.2 or less, or about 0.1 or less. In other embodiments, the volume $V_3$ is less than the volume $V_5$. It is also contemplated that the volumes $V_3$ and $V_5$ are equal or substantially equal to each other.

In one embodiment, for example, both first and second depressed-index cladding regions 43, 45 have a rectangular profile and the ratio $V_5/V_3$ is about 0.2, or about 0.3, or about 0.4. In another embodiment, for example, first depressed-index cladding region 43 has a triangular profile, second depressed-index cladding region 45 has a rectangular profile, and the ratio $V_5/V_3$ is about 0.1, or about 0.2, or about 0.3, or about 0.4.

Without intending to be limited by theory, and as discussed further below, the combination of first and second depressed-index cladding regions 43, 45 (i.e., dual trench design) provides low bend loss across more bend diameters than conventional fibers. Such reduced bend loss is able to be achieved at a relatively high mode field diameter. Additionally, as also discussed further below, the location of first and second depressed-index cladding regions 43, 45 are optimized to maintain a cable cutoff that meets the G.657 standards.

Outer Coatings

Primary coating 50 immediately surrounds glass fiber 20, and secondary coating 60 immediately surrounds primary coating 50. In some embodiments, primary coating 50 comprises a low modulus material and second coating 60 comprises a high modulus material. One or more of the materials may be, for example, acrylate.

Optical fiber 10 may also include a tertiary coating that surrounds secondary coating 60. The tertiary coating may include pigments, inks, or other coloring agents to mark the optical fiber for identification purposes and typically has a Young's modulus similar to the Young's modulus of the secondary coating.

An outer diameter of secondary coating 60 is an outer diameter of optical fiber 10, when a tertiary layer is not applied. The outer diameter of secondary coating 60 may be about 250 microns or less, or about 220 microns or less, or about 210 microns or less, or about 200 microns or less, or about 190 microns or less, or about 180 microns or less, or about 170 microns or less.

Properties

The optical fibers disclosed herein have good reduced bend sensitivity across all bend diameter (e.g., 15 mm, 20 mm, 30 mm). Thus, the optical fibers disclosed herein meet the G.657 bend loss standards across all these bend diameters. These bend loss standards are achieved while maintaining a high mode field diameter, in contrast to conventional fibers.

The optical fibers disclosed herein have a bend loss at 1550 nm, as determined by the mandrel wrap test having a diameter of 15 mm, of less than about 0.75 dB/turn, or less than about 0.50 dB/turn, or less than about 0.25 dB/turn, or less than about 0.20 dB/turn, or less than about 0.15 dB/turn, or less than about 0.14 dB/turn, or less than about 0.13 dB/turn, or less than about 0.12 dB/turn, or less than about 0.11 dB/turn, or less than about 0.10 dB/turn, or less than about 0.09 dB/turn, or less than about 0.08 dB/turn, or less than about 0.07 dB/turn, or less than about 0.06 dB/turn, or less than about 0.06 dB/turn.

Additionally, the optical fibers disclosed herein have a bend loss at 1550 nm, as determined by the mandrel wrap test having a diameter of 20 mm, of less than about 0.20 dB/turn, or less than about 0.15 dB/turn, or less than about 0.10 dB/turn, or less than about 0.08 dB/turn, or less than about 0.06 dB/turn, or less than about 0.05 dB/turn, or less than about 0.04 dB/turn, or less than about 0.03 dB/turn, or less than about 0.02 dB/turn, or less than about 0.01 dB/turn, or less than about 0.009 dB/turn, or less than about 0.008 dB/turn, or less than about 0.007 dB/turn, or less than about 0.006 dB/turn, or less than about 0.005 dB/turn, or less than about 0.004 dB/turn.

Additionally, the optical fibers disclosed herein have a bend loss at 1550 nm, as determined by the mandrel wrap test having a diameter of 30 mm, of less than about 0.0060 dB/turn, or less than about 0.0050 dB/turn, or less than about 0.0040 dB/turn, or less than about 0.0035 dB/turn, or less than about 0.0030 dB/turn, or less than about 0.0025 dB/turn, or less than about 0.0024 dB/turn, or less than about 0.0023 dB/turn, or less than about 0.0021 dB/turn, or less than about 0.0020 dB/turn, or less than about 0.0019 dB/turn, or less than about 0.0018 dB/turn, or less than about 0.0017 dB/turn, or less than about 0.0016 dB/turn, or less than about 0.0015 dB/turn, or less than about 0.0014 dB/turn, or less than about 0.0013 dB/turn, or less than about 0.0012 dB/turn, or less than about 0.0011 dB/turn, or less than about 0.0010 dB/turn, or less than about 0.0009 dB/turn, or less than about 0.00085 dB/turn, or less than about 0.0008 dB/turn.

As discussed above, and without intending to be limited by theory, the location and trench volume of first depressed-index cladding region 43 provides the G.657 compliant bend losses at smaller bend diameters (e.g., <25 mm) and the location and trench volume of second depressed-index cladding region 45 provides the G.657 compliant bend losses at larger bend diameters (e.g., >25 mm). It is also noted that the position of the second trench (second depressed-index cladding region 45) is chosen such that it has minimal or zero effect on the cable cutoff and does not negatively impact other optical properties (such as effective area, dispersion, etc.).

In addition to the low bend losses disclosed above, the optical fibers disclosed herein also have a mode field diameter, at 1310 nm wavelength, in range of about 8.9 microns or greater, or about 9.0 microns or greater, or about 9.1 microns or greater, or about 9.2 microns or greater, or about 9.3 microns or greater, or about 9.4 microns or greater, or about 9.5 microns or greater. In some embodiments, the mode field diameter is in a range from about 8.9 microns to about 9.7 microns, or from about 9.0 microns to about 9.6 microns. For example, the mode field diameter is about 9.07 microns, about 9.08 microns, about 9.23 microns, about 9.26 microns, or about 9.27 microns at 1310 nm wavelength.

The cable cutoff of the optical fibers disclosed herein is about 1300 nm or less, or about 1260 nm or less, or about 1250 nm or less, or about 1240 nm or less, or about 1230 nm or less, or about 1220 nm or less, or about 1210 nm or less, or about 1205 nm or less, or about 1200 nm or less, or about 1195 nm or less, or about 1190 nm or less, or about 1185 nm or less, or about 1180 nm or less, or about 1175 nm or less, or about 1170 nm or less. For example, the cable cutoff is about 1227 nm, about 1226 nm, about 1222 nm, about 1220 nm, about 1218 nm, about 1216 nm, about 1215 nm, about 1205 nm, about 1203 nm, about 1200 nm, about 1180 nm, or about 1176 nm.

Furthermore, the optical fibers disclosed herein have an effective area, at 1310 nm wavelength, of about 70.0 $micron^2$ or less, or about 69.0 $micron^2$ or less, or about 68.0 $micron^2$ or less, or about 67.0 $micron^2$ or less, or about 66.0 $micron^2$ or less, or about 65.0 $micron^2$ or less, or about 64.0 $micron^2$ or less, or about 63.0 $micron^2$ or less, or about 62.0 $micron^2$ or less, or about 61.0 $micron^2$ or less, or about 60.0 $micron^2$ or less. The optical fibers also have an effective area, at 1550 nm wavelength, of about 75 $micron^2$ or greater, or about 78 $micron^2$ or greater, or about 80 $micron^2$ or greater. Additionally or alternatively, the effective area, at 1550 nm wavelength, is about 95 $micron^2$ or less, or about 90 $micron^2$ or less, or about 85 $micron^2$ or less. In some embodiments, the effective area, at 1550 nm wavelength, is in range between 75 $micron^2$ and about 90 $micron^2$.

The optical fibers disclosed herein also have zero dispersion wavelength from about 1290 nm to about 1330 nm. For example, the zero dispersion wavelength can be from about 1295 nm to about 1325 nm, about 1300 nm to about 1324 nm, or from about 1305 nm to about 1315 nm. For example, the zero dispersion wavelength can be about 1280 nm, about 1285 nm, about 1289 nm, about 1290 nm, about 1300 nm, about 1301 nm, about 1305 nm, about 1306 nm, about 1310 nm, about 1315 nm, or about 1320 nm.

Additionally, the attenuation of the optical fibers disclosed herein is less than or equal to about 0.35 dB/km at 1310 nm wavelength, less than or equal to about 0.2 dB/km at 1550 nm wavelength, and less than or equal to about 0.35 dB/turn at 1625 nm wavelength. In some embodiments, the attenuation is less than or equal to about 0.19 dB/turn, or less than or equal to about 0.18 dB/turn, or less than or equal to about 0.185 dB/turn at 1550 nm wavelength.

According to an aspect of the present disclosure, the optical fibers have a dispersion having an absolute value at 1310 nm in a range between about −3 ps/nm/km and about 3 ps/nm/km and a dispersion slope at 1310 nm in a range between about 0.085 $ps/nm^2/km$ and 0.095 $ps/nm^2/km$. For example, the absolute value of the dispersion at 1310 nm can be from about 2 ps/nm/km to about 2 ps/nm/km, about 1.5 ps/nm/km to about 1.5 ps/nm/km, about 1.5 ps/nm/km to about 1 ps/nm/km. For example, the absolute value of the dispersion at 1310 nm can be about 1.2 ps/nm/km, about 0.1 ps/nm/km, about 0.7 ps/nm/km, about 0.4 ps/nm/km, about 0.2 ps/nm/km, about 0.0 ps/nm/km, about 0.2 ps/nm/km, about 0.4 ps/nm/km, about 0.6 ps/nm/km, about 0.8 ps/nm/km, about 0.9 ps/nm/km, or any value between these values. In one example, the dispersion slope at 1310 nm can be about 0.07 $ps/nm^2/km$ to about 0.1 $ps/nm^2/km$, about 0.08 $ps/nm^2/km$ to about 0.1 $ps/nm^2/km$, about 0.085 $ps/nm^2/km$ to about 0.1 $ps/nm^2/km$, about 0.09 $ps/nm^2/km$ to about 0.1 $ps/nm^2/km$, about 0.075 $ps/nm^2/km$ to about 0.09 $ps/nm^2/km$, about 0.08 $ps/nm^2/km$ to about 0.09 $ps/nm^2/km$, or about 0.085 $ps/nm^2/km$ to about 0.09 $ps/nm^2/km$. For example, the dispersion slope at 1310 nm can be about 0.075 $ps/nm^2/km$, about 0.08 $ps/nm^2/km$, about 0.085 $ps/nm^2/km$, about 0.086 $ps/nm^2/km$, about 0.087 $ps/nm^2/km$, about 0.088 $ps/nm^2/km$, about 0.089 $ps/nm^2/km$, about 0.09 $ps/nm^2/km$, or about 0.01 $ps/nm^2/km$.

According to an aspect of the present disclosure, the optical fibers have a dispersion at 1550 nm of less than 22 ps/nm/km and a dispersion slope at 1550 nm of less than 0.1 $ps/nm^2/km$. For example, the dispersion at 1550 nm can be from about 10 ps/nm/km to about 22 ps/nm/km, about 10 ps/nm/km to about 22 ps/nm/km, about 10 ps/nm/km to about 20 ps/nm/km, about 10 ps/nm/km to about 15 ps/nm/km, about 15 ps/nm/km to about 22 ps/nm/km, or about 15 ps/nm/km to about 20 ps/nm/km. For example, the dispersion at 1550 can be about 10 ps/nm/km, about 15 ps/nm/km, about 16 ps/nm/km, about 17 ps/nm/km, about 17.5 ps/nm/km, about 18 ps/nm/km, about 19 ps/nm/km, about 19.5 ps/nm/km, about 19.6 ps/nm/km, about 20 ps/nm/km, about 20.1 ps/nm/km, about 22 ps/nm/km, or any value between these values. In one example, the dispersion slope at 1550 nm can be about 0.04 $ps/nm^2/km$ to about 0.1 $ps/nm^2/km$, about 0.05 $ps/nm^2/km$ to about 0.1 $ps/nm^2/km$, about 0.055 $ps/nm^2/km$ to about 0.1 $ps/nm^2/km$, about 0.06 $ps/nm^2/km$ to about 0.1 $ps/nm^2/km$, about 0.08 $ps/nm^2/km$ to about 0.1 $ps/nm^2/km$, about 0.04 $ps/nm^2/km$ to about 0.08 $ps/nm^2/km$, about 0.05 ps/nm²/km to about 0.08 ps/nm²/km, about 0.055 ps/nm²/km to about 0.08 ps/nm²/km, about 0.06 ps/nm²/km to about 0.08 ps/nm²/km, about 0.04 ps/nm²/km to about 0.06 ps/nm²/km, about 0.05 ps/nm²/km to about 0.06 ps/nm²/km, or about 0.055 ps/nm²/km to about 0.06 ps/nm²/km. For example, the dispersion slope at 1550 nm can be about 0.04 ps/nm²/km, about 0.05 ps/nm²/km, about 0.055 ps/nm²/km, about 0.057 ps/nm²/km, about 0.058 ps/nm²/km, about 0.059 ps/nm²/km, about 0.06 ps/nm²/km, about 0.061 ps/nm²/km, about 0.07 ps/nm²/km, or about 0.08 ps/nm²/km.

Exemplary Embodiments

Provided below are exemplary embodiments of the optical fibers disclosed herein. The below examples are intended to be exemplary, and are not intended to limit the scope of the disclosure. The exemplary embodiments shown below have a dual trench design with a mode field diameter at 1310 nm of 9 microns or greater, a cable cutoff of less than or equal to 1260 nm, and zero dispersion wavelength between 1300 nm and 1324 nm.

Table 1 below provides four exemplary embodiments (Ex 1-4) and a comparative example (C1). Exemplary embodiments Ex 1-4 are shown in FIGS. 6-9. Exemplary embodiments Ex 1-4 all have a dual trench design with two rectangular shaped depressed-index cladding regions, a peak core refractive index ($\Delta 1_{max}$) of 0.336%, and a core alpha of 12. Although comparative example C1, which only has a single depressed-index cladding region, has the same mode field diameter of exemplary embodiments Ex 1-4, comparative example C1 does not meet the G.657 standards across all bend diameters. More specifically, comparative example C1 does not meet the 30 mm bend loss standard.

TABLE 1

|  | C1 | Ex 1 | Ex2 | Ex3 | Ex4 |
|---|---|---|---|---|---|
| Maximum Core Index, $\Delta_{1max}$ (%) | 0.336 | 0.336 | 0.336 | 0.336 | 0.336 |
| Core Radius, $r_1$, microns | 4.2 | 4.2 | 4.2 | 4.2 | 4.2 |
| Core alpha | 12 | 12 | 12 | 12 | 12 |
| Inner Cladding Index, $\Delta_2$ (%) | 0 | 0 | 0 | 0 | 0 |
| Inner Cladding Radius, $r_2$ (microns) | 9.14 | 9.14 | 9.14 | 9.14 | 9.14 |
| First Depressed-Index Cladding Shape | Rectangular | Rectangular | Rectangular | Rectangular | Rectangular |
| First Depressed-Index Cladding Minimum Index, $\Delta_{3, min}$ (%) | −0.45 | −0.45 | −0.45 | −0.45 | −0.45 |
| First Depressed-Index Cladding Outer Radius, $r_3$ (micron) | 14.2 | 14.2 | 14.2 | 14.2 | 14.2 |
| Volume of First Depressed-Index Cladding Region, $V_3$, %Δ micron² | −53.14 | −53.14 | −53.14 | −53.14 | −53.14 |
| Intermediate Cladding Index, $\Delta_4$ (%) | 0 | 0 | 0 | 0 | 0 |
| Intermediate Cladding Radius, $r_4$ (microns) | NA | 20.24 | 20.24 | 20.24 | 20.24 |
| Second Depressed-Index Cladding Shape | NA | Rectangular | Rectangular | Rectangular | Rectangular |
| Second Depressed-Index Cladding Minimum Index, $\Delta_{5, min}$ (%) | NA | −0.04 | −0.06 | −0.08 | −0.1 |
| Second Depressed-Index Cladding Outer Radius, $r_5$ (micron) | NA | 24.8 | 24.8 | 24.8 | 24.8 |
| Volume of Second Depressed-Index Cladding Region, $V_5$, %Δ micron² | 0 | −8.22 | −12.32 | −16.43 | −20.54 |
| Outer Cladding Index, $\Delta_6$ (%) | 0 | 0 | 0 | 0 | 0 |
| Outer Cladding Radius, $r_6$, microns | 62.5 | 62.5 | 62.5 | 62.5 | 62.5 |
| Ratio of $V_5/V_3$ | 0 | 0.155 | 0.232 | 0.309 | 0.387 |
| Center of Mass Radial Position of First Depressed-Index Cladding Region (microns) | 11.85 | 11.85 | 11.85 | 11.85 | 11.85 |
| Center of Mass Radial Position of Second Depressed-Index Cladding Region (microns) | NA | 22.60 | 22.60 | 22.60 | 22.60 |

TABLE 1-continued

|  | C1 | Ex 1 | Ex2 | Ex3 | Ex4 |
|---|---|---|---|---|---|
| Ratio of Center of Mass Radial Position of First and Second Depressed-Index Regions | NA | 0.525 | 0.525 | 0.525 | 0.525 |
| Mode Field Diameter (micron) at 1310 nm | 9.07 | 9.07 | 9.07 | 9.07 | 9.07 |
| Effective Area at 1310 nm (micron$^2$) | 64.5 | 64.5 | 64.5 | 64.5 | 64.5 |
| Zero Dispersion Wavelength (nm) | 1310 | 1310 | 1309 | 1309 | 1309 |
| Dispersion at 1310 nm (ps/nm/km) | 0 | 0 | 0.069 | 0.07 | 0.073 |
| Dispersion Slope at 1310 nm (ps/nm2/km) | 0.092 | 0.077 | 0.069 | 0.07 | 0.073 |
| Mode Field Diameter (micron) at 1550 nm | 10.14 | 10.14 | 10.14 | 10.14 | 10.14 |
| Effective Area at 1550 nm (micron$^2$) | 79.16 | 79.16 | 79.15 | 79.15 | 79.16 |
| Dispersion at 1550 nm (ps/nm/km) | 19.03 | 19.02 | 19.03 | 19.03 | 19.03 |
| Dispersion Slope at 1550 nm (ps/nm2/km) | 0.066 | 0.064 | 0.064 | 0.064 | 0.064 |
| Cable Cutoff (nm) | 1215 | 1216 | 1218 | 1220 | 1222 |
| Bend Loss for 15 mm mandrel diameter at 1550 nm (dB/turn) | 0.118 | 0.134 | 0.149 | 0.154 | 0.141 |
| Bend Loss for 20 mm mandrel diameter at 1550 nm (dB/turn) | 0.04 | 0.065 | 0.043 | 0.028 | 0.018 |
| Bend Loss for 30 mm mandrel diameter at 1550 nm (dB/turn) | 0.0063 | 0.0029 | 0.0021 | 0.0016 | 0.0011 |

Figure 10:
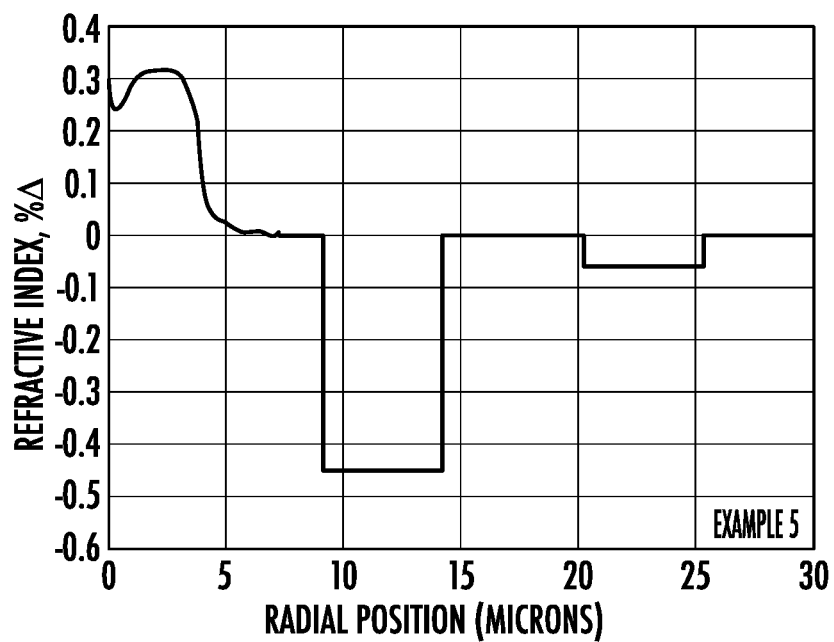
Figure 11:
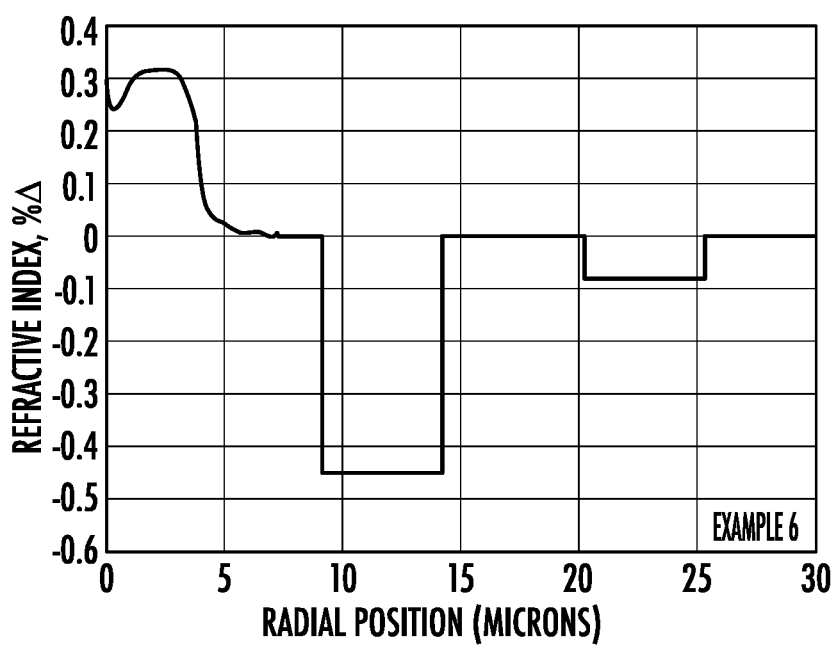
Figure 12:
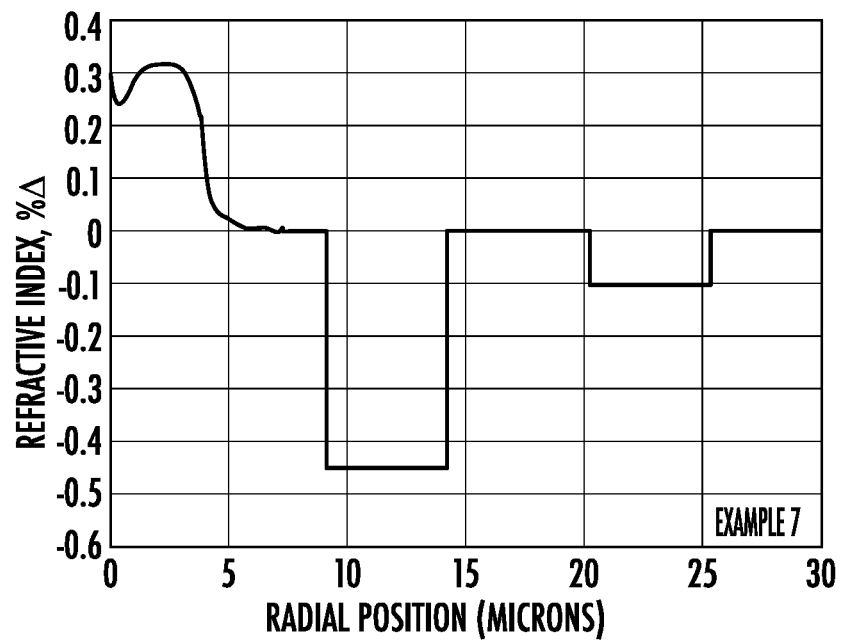
Figure 13:
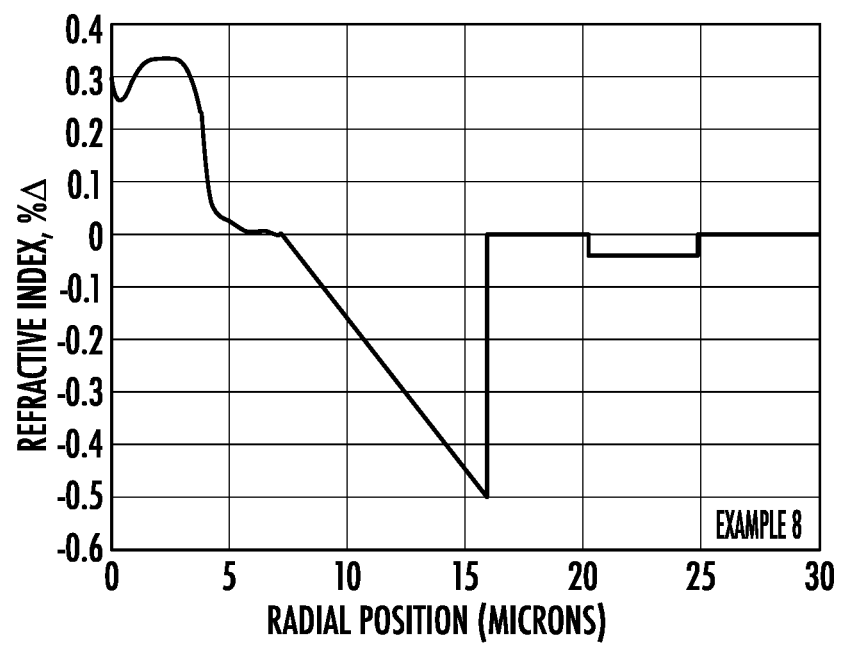
Figure 14:
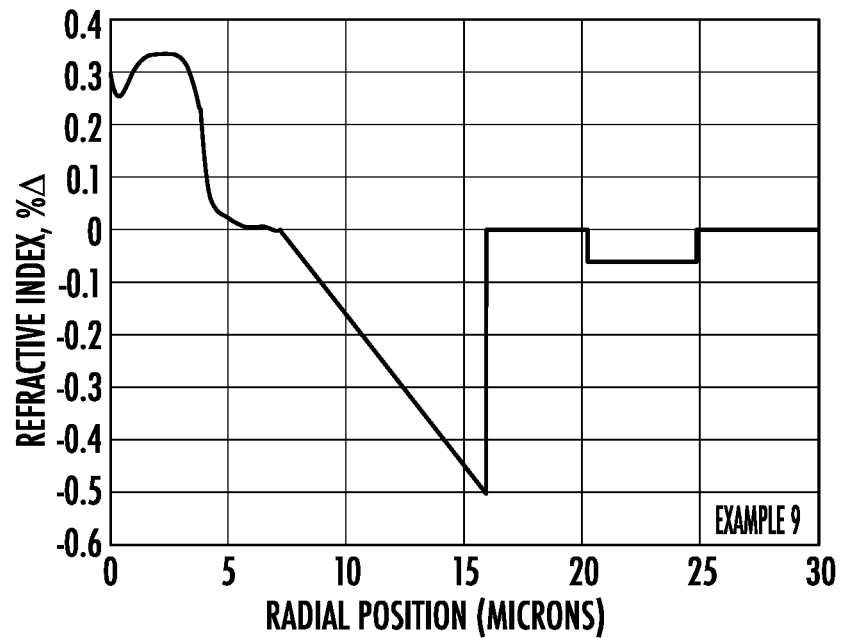
Figure 15:
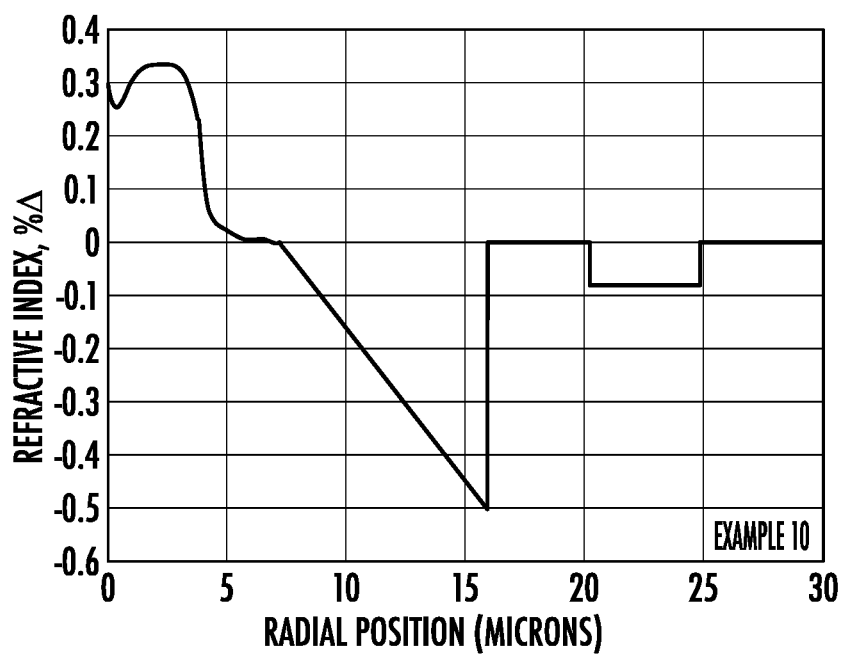
Figure 16:
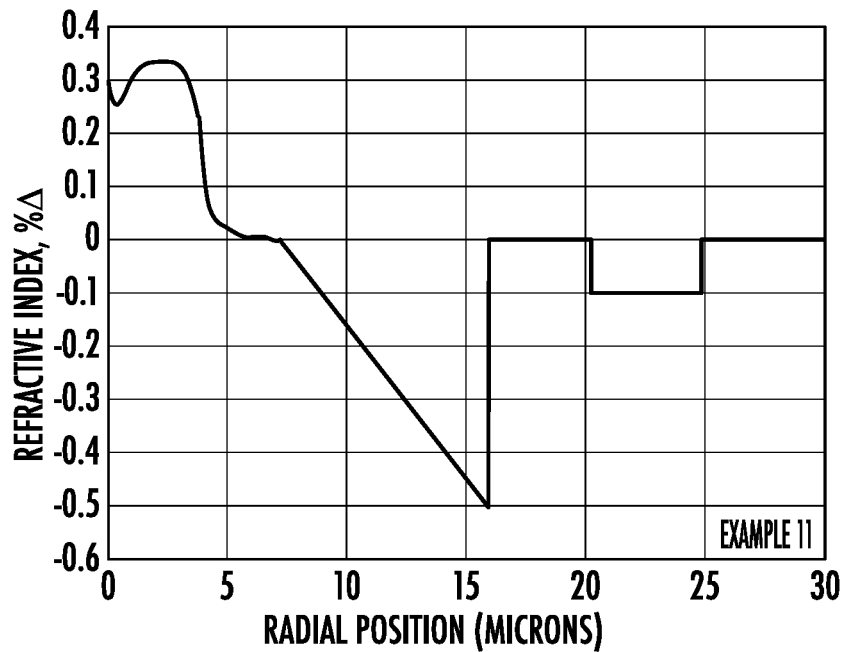
Figure 17:
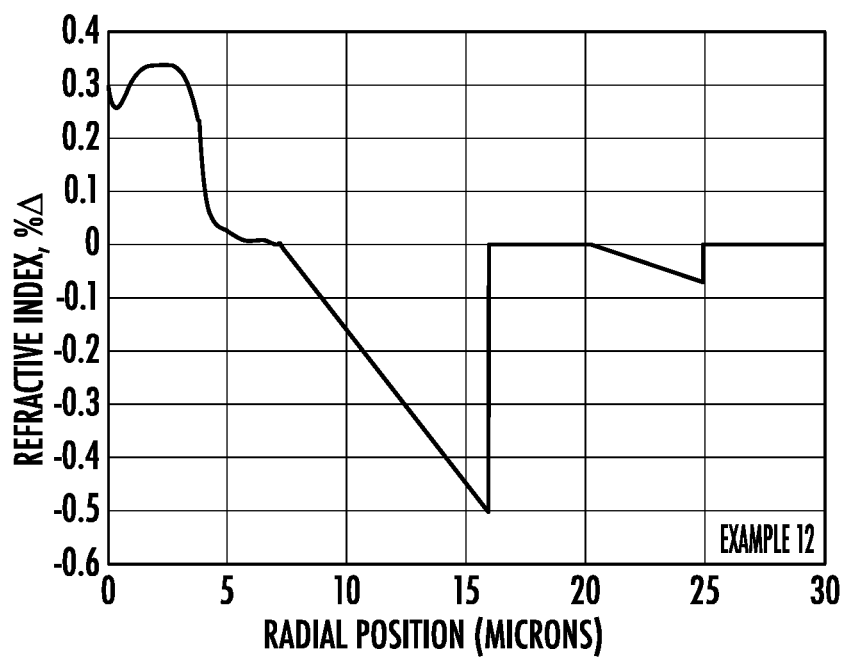
Figure 18:
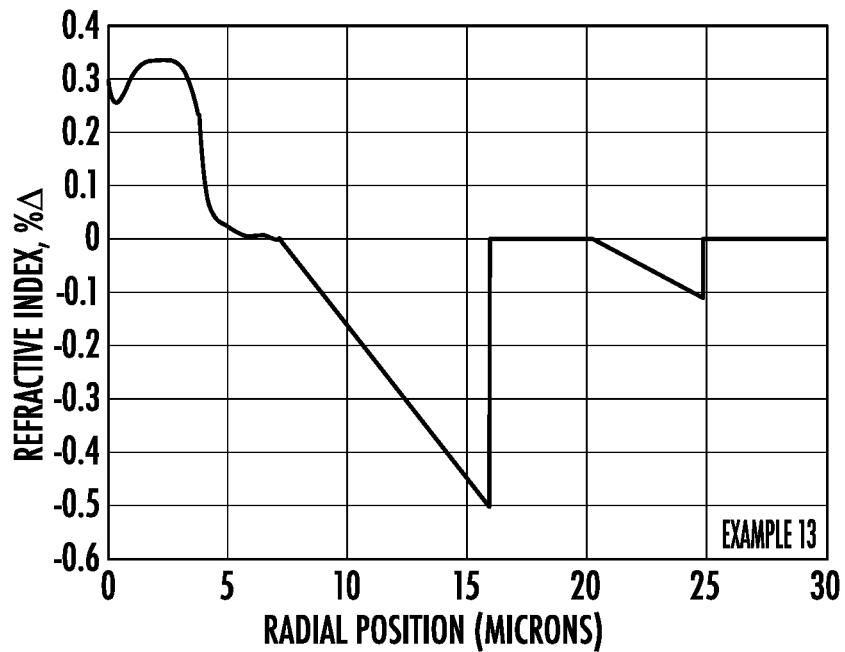
Figure 19:
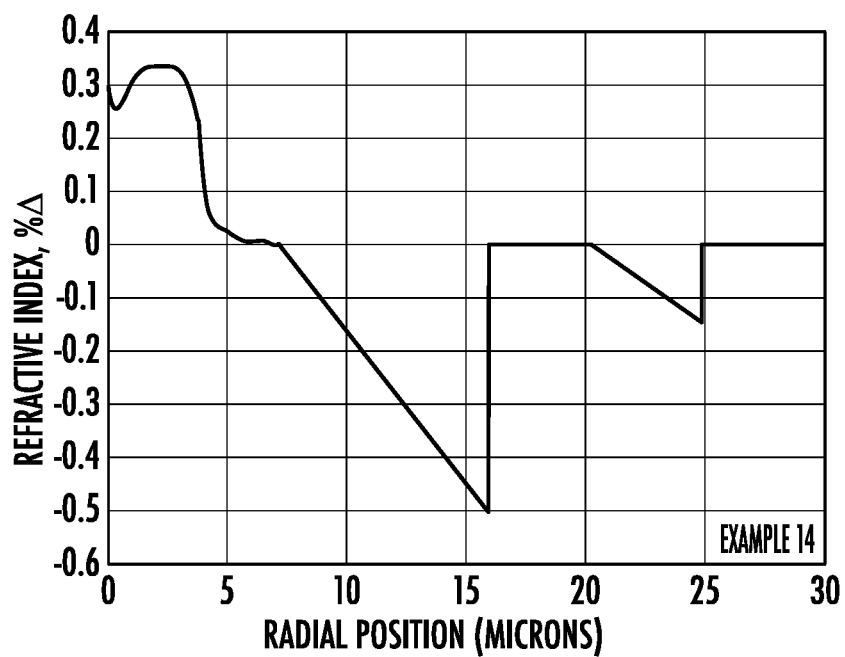
Figure 20:
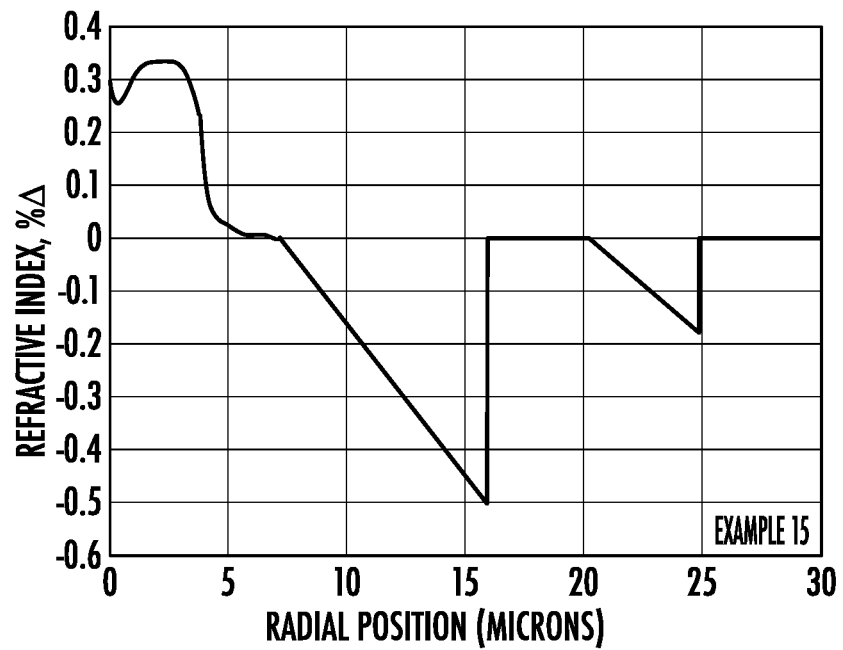
Figure 21:
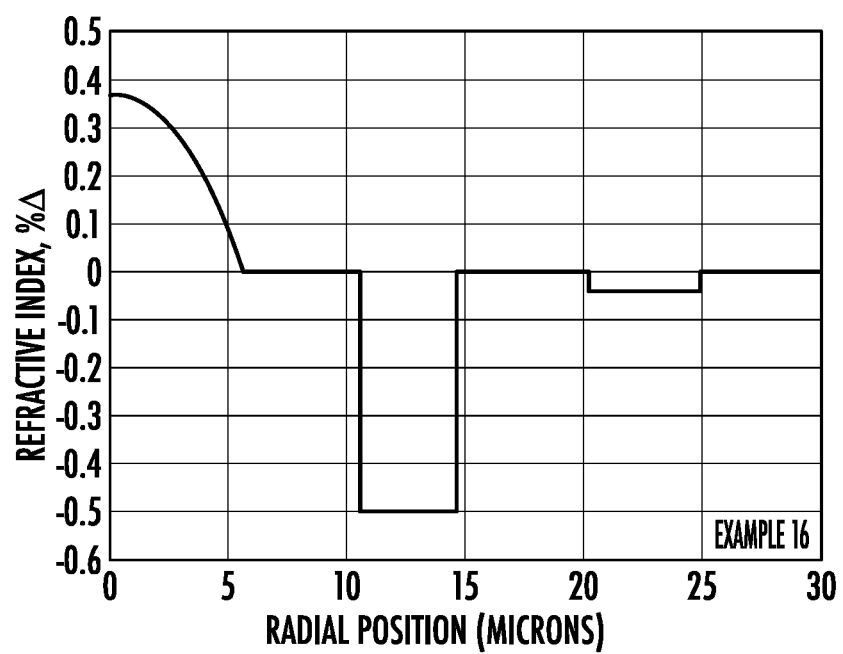
Figure 22:
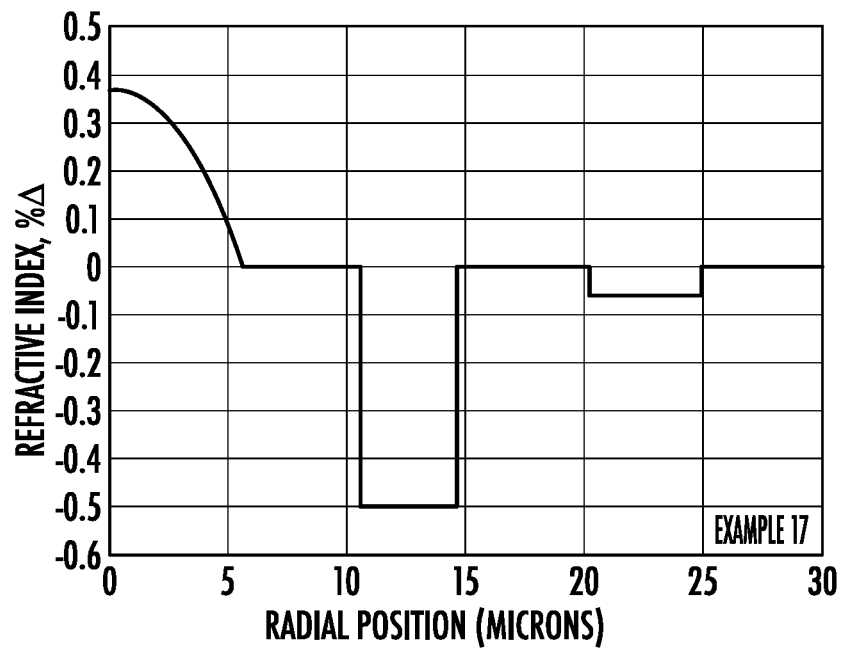
Figure 23:
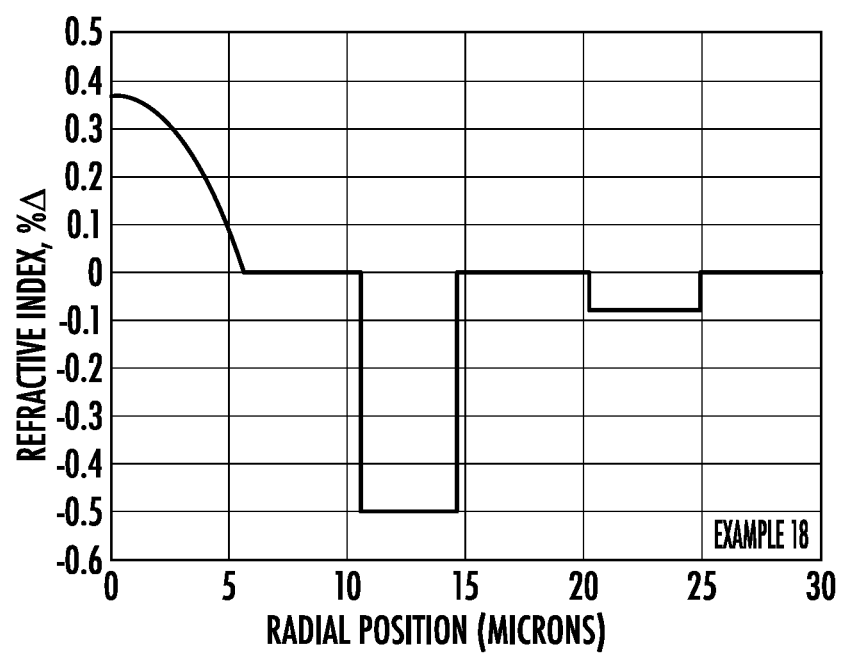
Figure 24:
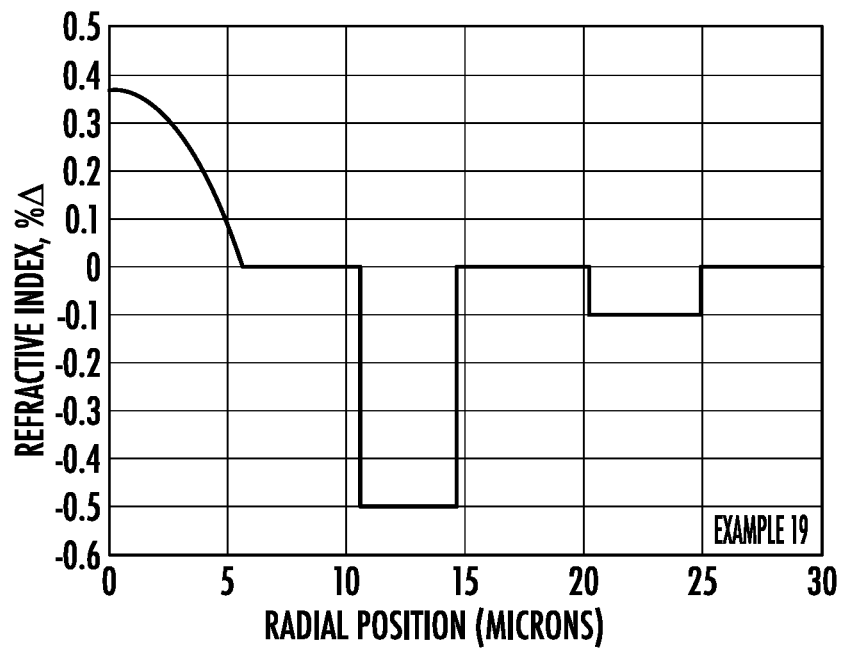
Figure 25:
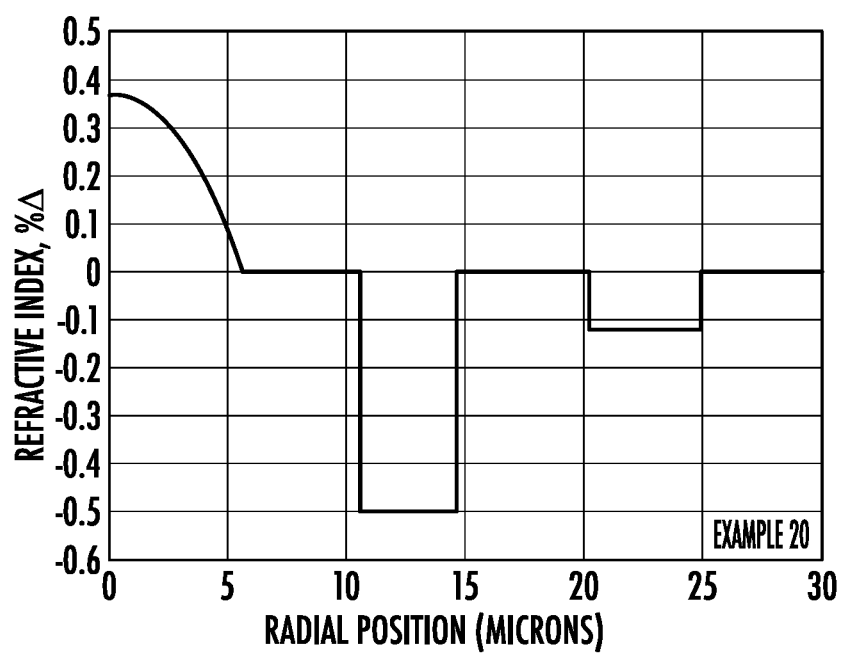
Figure 26:
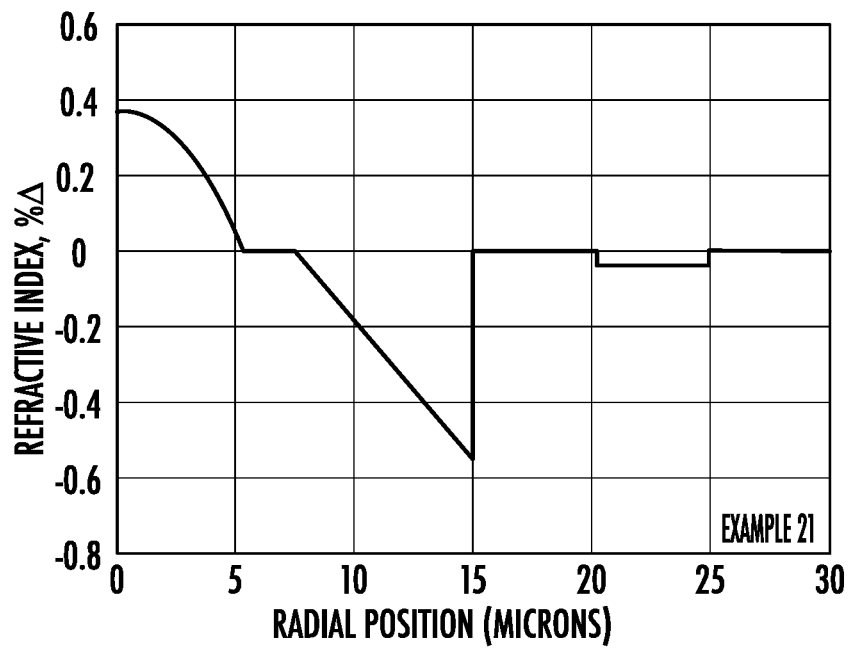
Figure 27:
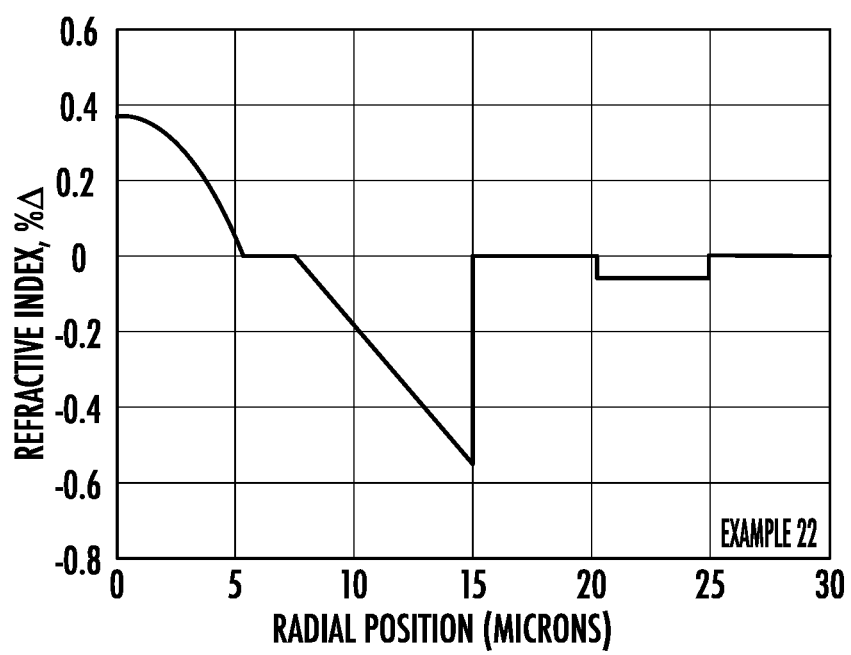
Figure 28:
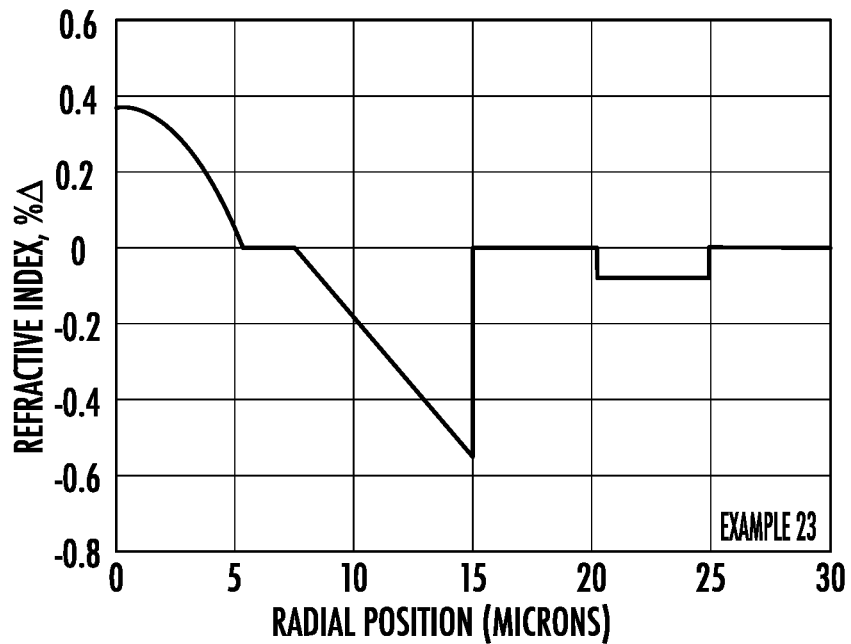
Figure 29:
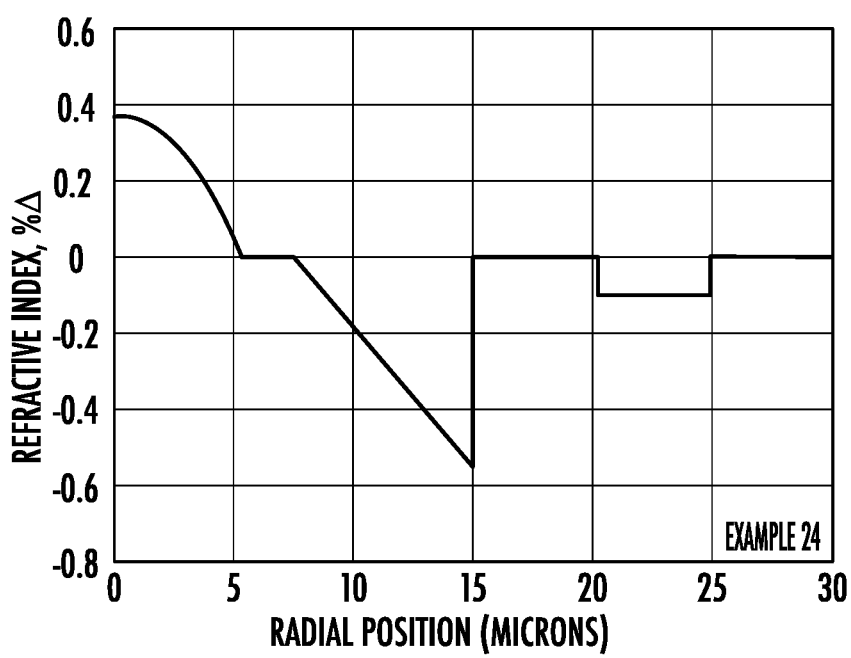
Figure 30:
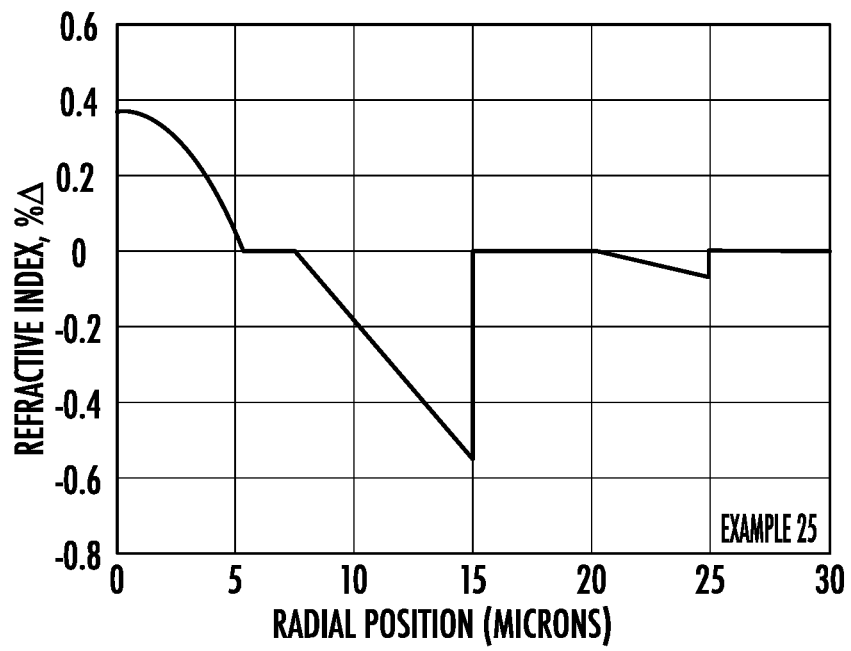
Figure 31:
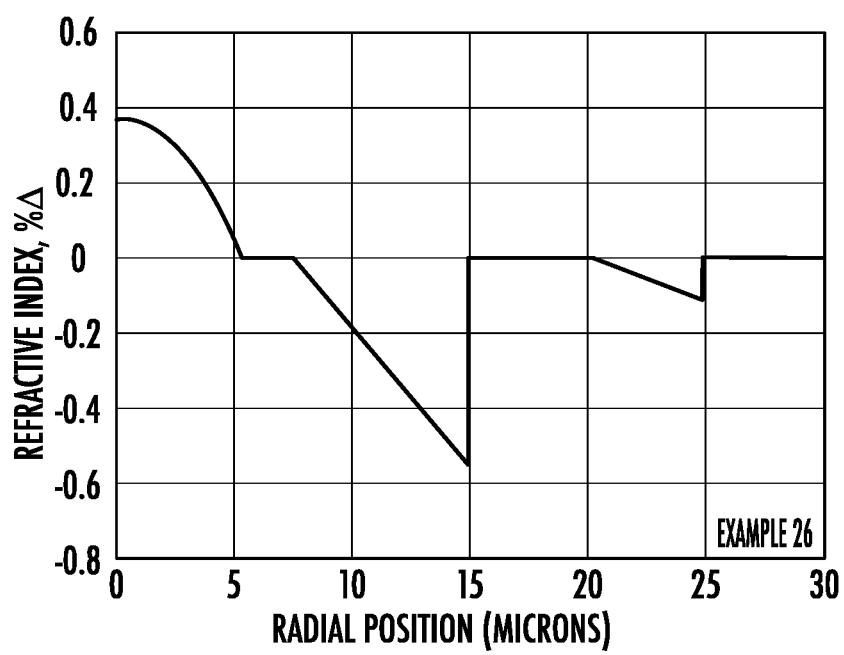
Figure 32:
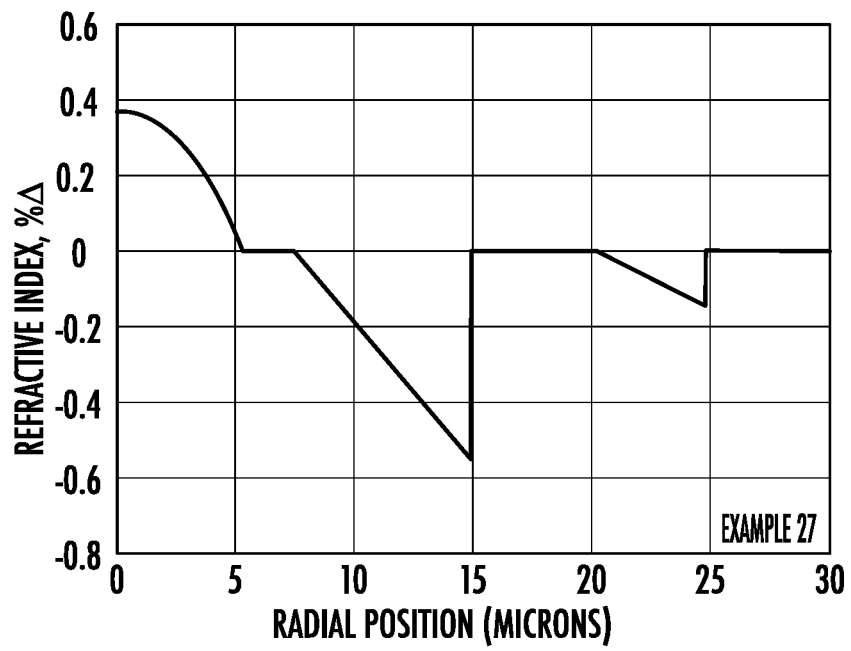
Figure 33:
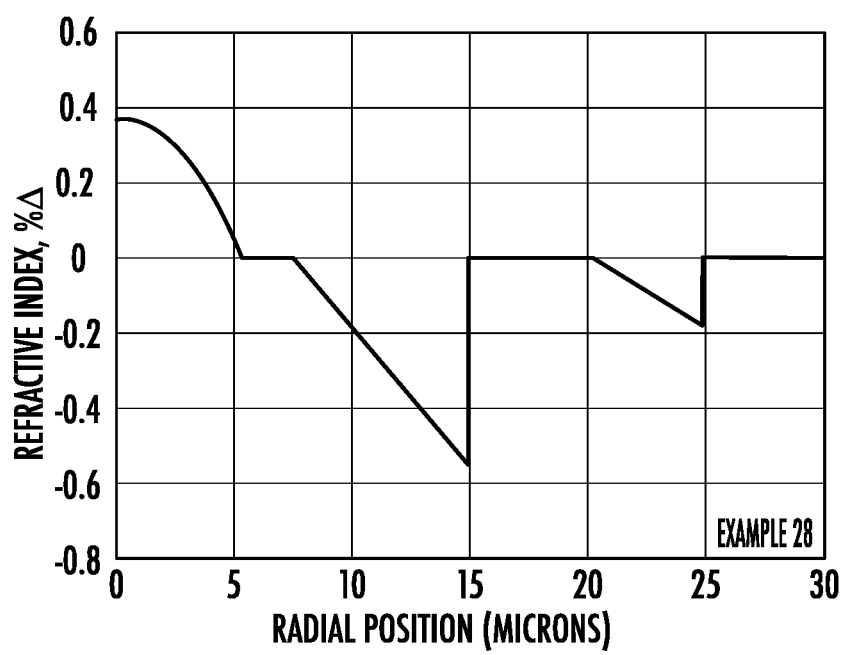
Figure 34:
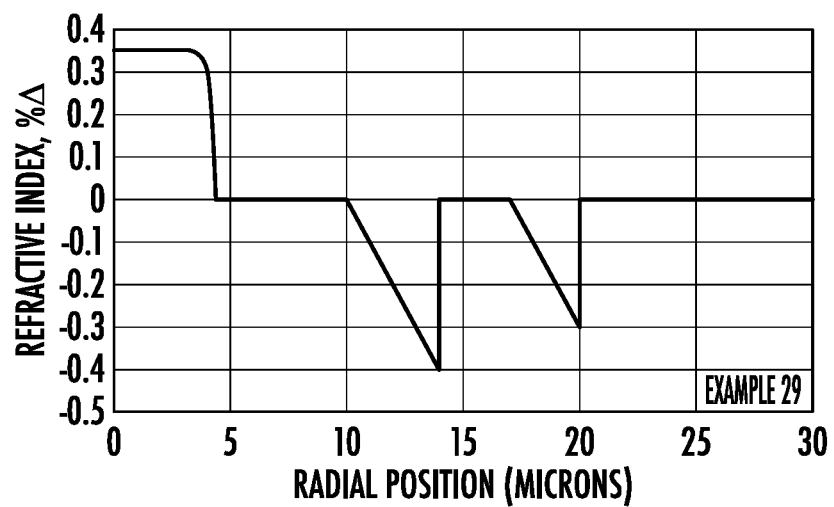
Figure 35:
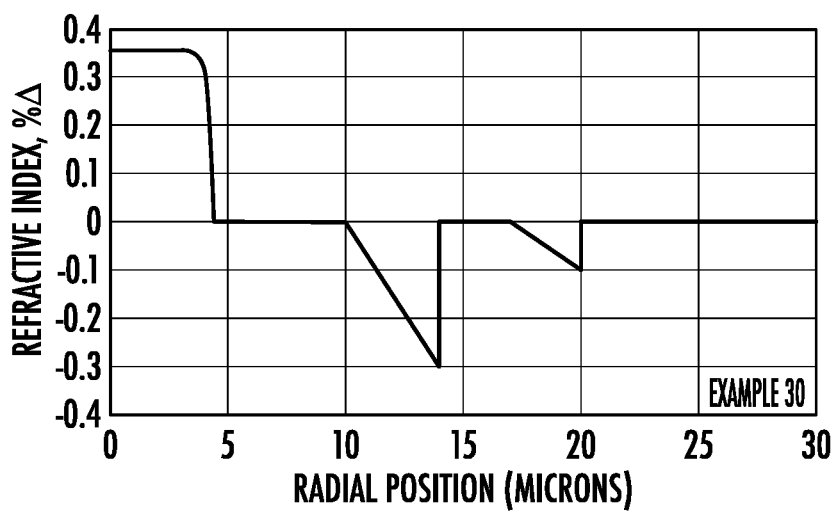
Figure 36:
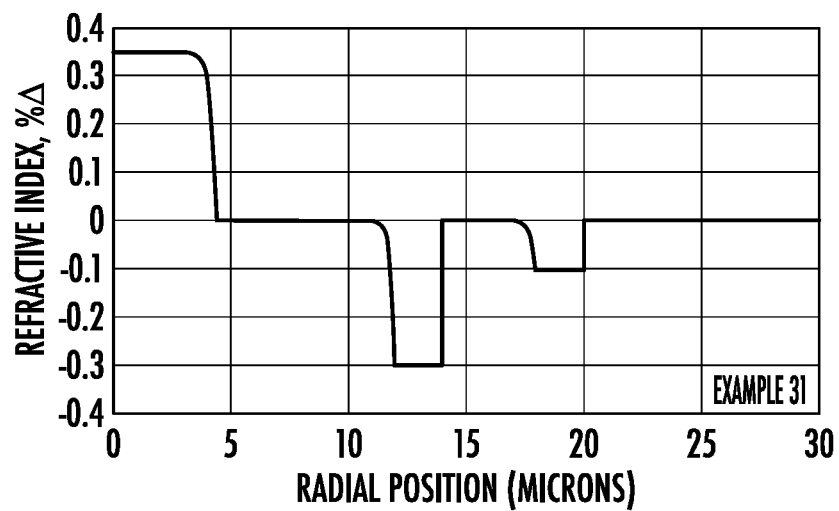
Figure 37:
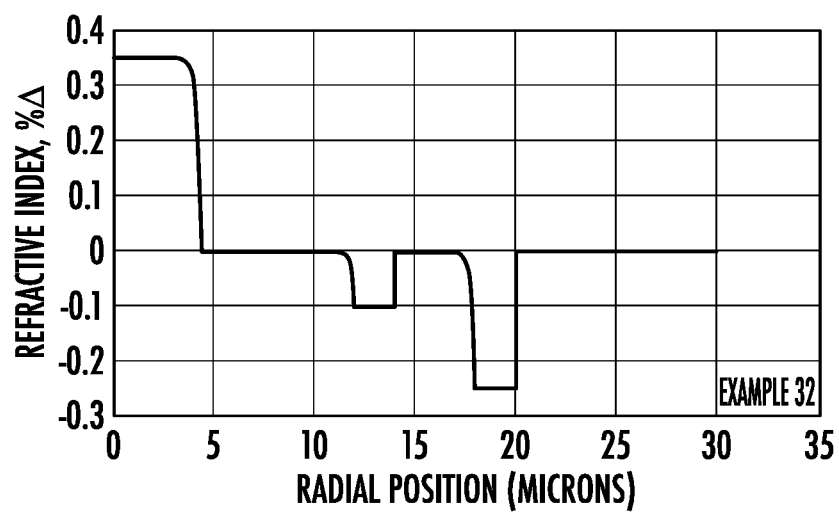
Figure 38:
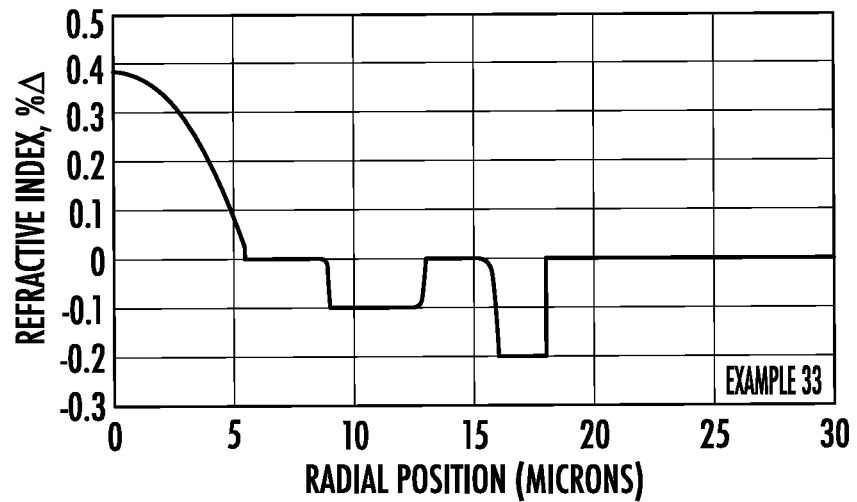
Figure 39:
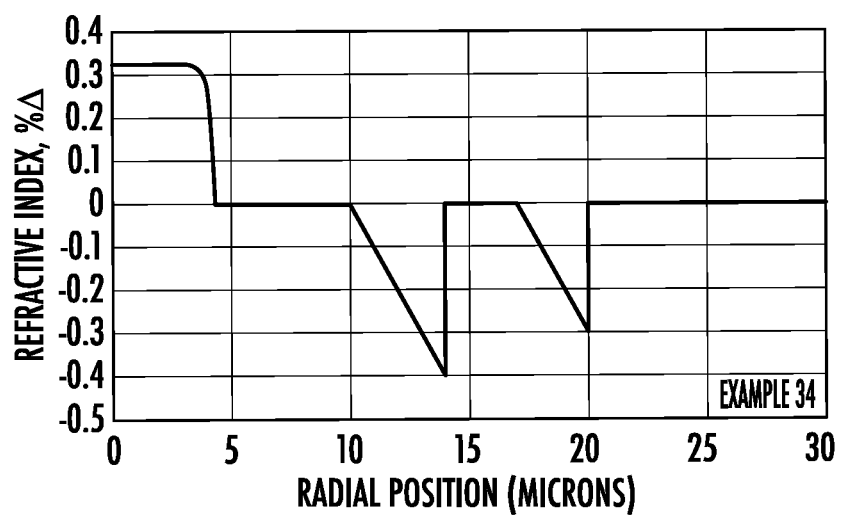
Figure 40:
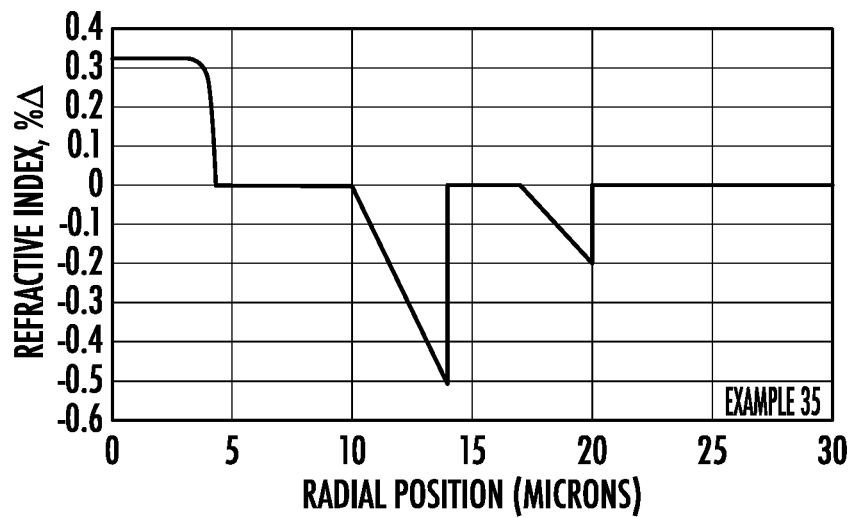
Figure 41:
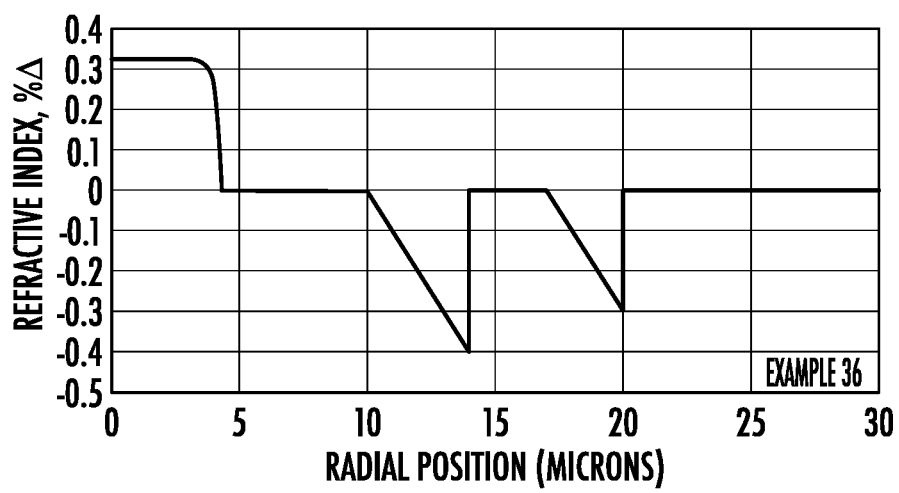
Figure 42:
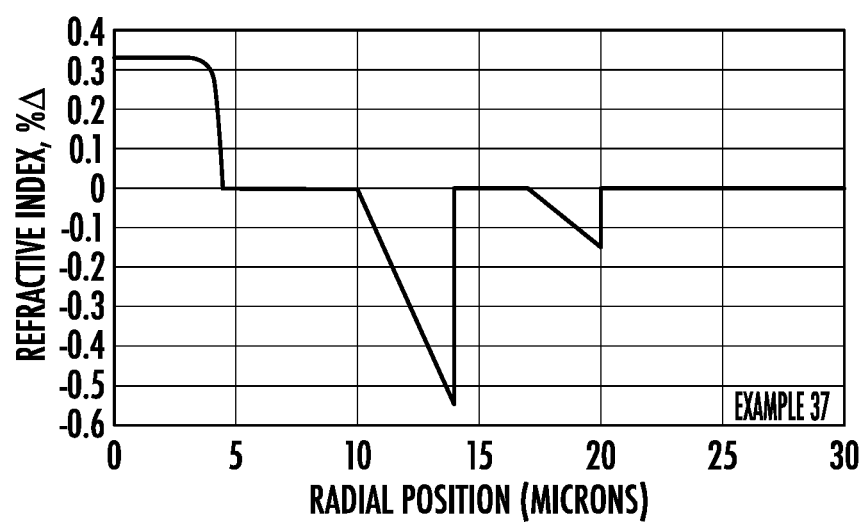

Table 2 below provides three exemplary embodiments (Ex 5-7), which are also shown in FIGS. 10-12. Exemplary embodiments Ex 5-7 all have a dual trench design with two rectangular shaped depressed-index cladding regions, a peak core refractive index ($\Delta 1_{max}$) of 0.317%, and a core alpha of 12.

TABLE 2

|  | Ex 5 | Ex6 | Ex7 |
|---|---|---|---|
| Maximum Core Index, $\Delta_{1max}$ (%) | 0.317 | 0.317 | 0.317 |
| Core Radius, $r_1$, microns | 4.2 | 4.2 | 4.2 |
| Core alpha | 12 | 12 | 12 |
| Inner Cladding Index, $\Delta_2$ (%) | 0 | 0 | 0 |
| Inner Cladding Radius, $r_2$ (microns) | 9.14 | 9.14 | 9.14 |
| First Depressed-Index Cladding Shape | Rectangular | Rectangular | Rectangular |
| First Depressed-Index Cladding Minimum Index, $\Delta_{3,min}$ (%) | −0.45 | −0.45 | −0.45 |
| First Depressed-Index Cladding Outer Radius, $r_3$ (micron) | 14.2 | 14.2 | 14.2 |
| Volume of First Depressed-Index Cladding Region, $V_3$, %Δ micron$^2$ | −53.14 | −53.14 | −53.14 |
| Intermediate Cladding Index, $\Delta_4$ (%) | 0 | 0 | 0 |
| Intermediate Cladding Radius, $r_4$ (microns) | 20.24 | 20.24 | 20.24 |
| Second Depressed-Index Cladding Shape | Rectangular | Rectangular | Rectangular |
| Second Depressed-Index Cladding Minimum Index, $\Delta_{5,min}$ (%) | −0.06 | −0.08 | −0.1 |
| Second Depressed-Index Cladding Outer Radius, $r_5$ (micron) | 25.3 | 25.3 | 25.3 |
| Volume of Second Depressed-Index Cladding Region, $V_5$, %Δ micron$^2$ | −13.83 | −18.43 | −23.04 |
| Outer Cladding Index, $\Delta_6$ (%) | 0 | 0 | 0 |
| Outer Cladding Radius, $r_6$, microns | 62.5 | 62.5 | 62.5 |
| Ratio of $V_5/V_3$ | 0.260 | 0.347 | 0.434 |
| Center of Mass Radial Position of First Depressed-Index Cladding Region (microns) | 11.85 | 11.85 | 11.85 |
| Center of Mass Radial Position of Second Depressed-Index Cladding Region (microns) | 22.86 | 22.86 | 22.86 |
| Ratio of Center of Mass Radial Position of First and Second Depressed-Index Regions | 0.518 | 0.518 | 0.518 |
| Mode Field Diameter (micron) at 1310 nm | 9.23 | 9.23 | 9.23 |
| Effective Area at 1310 nm (micron$^2$) | 66.63 | 66.6 | 66.6 |
| Zero Dispersion Wavelength (nm) | 1308 | 1307 | 1305 |
| Dispersion at 1310 nm (ps/nm/km) | 0.1392 | 0.1899 | 0.27 |
| Dispersion Slope at 1310 nm (ps/nm2/km) | 0.0696 | 0.0633 | 0.054 |

TABLE 2-continued

|  | Ex 5 | Ex6 | Ex7 |
| --- | --- | --- | --- |
| Mode Field Diameter (micron) at 1550 nm | 10.32 | 10.32 | 10.32 |
| Effective Area at 1550 nm (micron$^2$) | 81.97 | 81.97 | 81.97 |
| Dispersion at 1550 nm (ps/nm/km) | 19.2 | 19.2 | 19.19 |
| Dispersion Slope at 1550 nm (ps/nm2/km) | 0.064 | 0.064 | 0.064 |
| Cable Cutoff (nm) | 1176 | 1180 | 1181 |
| Bend Loss for 15 mm mandrel diameter at 1550 nm (dB/turn) | 0.2078 | 0.2145 | 0.213 |
| Bend Loss for 20 mm mandrel diameter at 1550 nm (dB/turn) | 0.0878 | 0.0626 | 0.04 |
| Bend Loss for 30 mm mandrel diameter at 1550 nm (dB/turn) | 0.0034 | 0.0023 | 0.0016 |

Table 3 below provides four exemplary embodiments (Ex 8-11), which are also shown in FIGS. 13-16. Exemplary embodiments Ex 8-11 all have a dual trench design with both a triangular and a rectangular shaped depressed-index cladding region, a peak core refractive index ($\Delta 1_{max}$ of 0.336%, and a core alpha of 12.

TABLE 3

|  | Ex8 | Ex9 | Ex10 | Ex11 |
| --- | --- | --- | --- | --- |
| Maximum Core Index, $\Delta_{1max}$ (%) | 0.336 | 0.336 | 0.336 | 0.336 |
| Core Radius, $r_1$, microns | 4.2 | 4.2 | 4.2 | 4.2 |
| Core alpha | 12 | 12 | 12 | 12 |
| Inner Cladding Index, $\Delta_2$ (%) | 0 | 0 | 0 | 0 |
| Inner Cladding Radius, $r_2$ (microns) | 7.16 | 7.16 | 7.16 | 7.16 |
| First Depressed-Index Cladding Shape | Triangular | Triangular | Triangular | Triangular |
| First Depressed-Index Cladding Minimum Index, $\Delta_{3,min}$ (%) | −0.5 | −0.5 | −0.5 | −0.5 |
| First Depressed-Index Cladding Outer Radius, $r_3$ (micron) | 15.9 | 15.9 | 15.9 | 15.9 |
| Volume of First Depressed-Index Cladding Region, $V_3$, %Δ micron$^2$ | −56.9 | −56.9 | −56.9 | −56.9 |
| Intermediate Cladding Index, $\Delta_4$ (%) | 0 | 0 | 0 | 0 |
| Intermediate Cladding Radius, $r_4$ (microns) | 20.24 | 20.24 | 20.24 | 20.24 |
| Second Depressed-Index Cladding Shape | Rectangular | Rectangular | Rectangular | Rectangular |
| Second Depressed-Index Cladding Minimum Index, $\Delta_{5,min}$ (%) | −0.04 | −0.06 | −0.08 | −0.1 |
| Second Depressed-Index Cladding Outer Radius, $r_5$ (micron) | 24.8 | 24.8 | 24.8 | 24.8 |
| Volume of Second Depressed-Index Cladding Region, $V_5$, %Δ micron$^2$ | −8.22 | −12.32 | −16.43 | −20.54 |
| Outer Cladding Index, $\Delta_6$ (%) | 0 | 0 | 0 | 0 |
| Outer Cladding Radius, $r_6$, microns | 62.5 | 62.5 | 62.5 | 62.5 |
| Ratio of $V_5/V_3$ | 0.144 | 0.217 | 0.289 | 0.361 |
| Center of Mass Radial Position of First Depressed-Index Cladding Region (microns) | 13.32 | 13.32 | 13.32 | 13.32 |
| Center of Mass Radial Position of Second Depressed-Index Cladding Region (microns) | 22.60 | 22.60 | 22.60 | 22.60 |

TABLE 3-continued

| | Ex8 | Ex9 | Ex10 | Ex11 |
|---|---|---|---|---|
| Ratio of Center of Mass Radial Position of First and Second Depressed-Index Regions | 0.59 | 0.59 | 0.59 | 0.59 |
| Mode Field Diameter (micron) at 1310 nm | 9.08 | 9.08 | 9.08 | 9.08 |
| Effective Area at 1310 nm (micron$^2$) | 64.5 | 64.5 | 64.5 | 64.5 |
| Zero Dispersion Wavelength (nm) | 1314 | 1314 | 1314 | 1314 |
| Dispersion at 1310 nm (ps/nm/km) | −0.332 | −0.344 | −0.332 | −0.336 |
| Dispersion Slope at 1310 nm (ps/nm2/km) | 0.083 | 0.086 | 0.083 | 0.084 |
| Mode Field Diameter (micron) at 1550 nm | 10.21 | 10.21 | 10.21 | 10.21 |
| Effective Area at 1550 nm (micron$^2$) | 79.78 | 79.78 | 79.78 | 79.78 |
| Dispersion at 1550 nm (ps/nm/km) | 18.32 | 18.32 | 18.32 | 18.32 |
| Dispersion Slope at 1550 nm (ps/nm2/km) | 0.064 | 0.064 | 0.064 | 0.064 |
| Cable Cutoff (nm) | 1226 | 1226 | 1227 | 1227 |
| Bend Loss for 15 mm mandrel diameter at 1550 nm (dB/turn) | 0.089 | 0.093 | 0.088 | 0.074 |
| Bend Loss for 20 mm mandrel diameter at 1550 nm (dB/turn) | 0.042 | 0.027 | 0.018 | 0.012 |
| Bend Loss for 30 mm mandrel diameter at 1550 nm (dB/turn) | 0.0023 | 0.0017 | 0.0012 | 0.00095 |

Table 4 below provides four exemplary embodiments (Ex 12-15), which are also shown in FIGS. 17-20. Exemplary embodiments Ex 12-15 all have a dual trench design with two triangular shaped depressed-index cladding regions, a peak core refractive index ($\Delta 1_{max}$) of 0.336%, and a core alpha of 12.

TABLE 4

| | Ex12 | Ex13 | Ex14 | Ex15 |
|---|---|---|---|---|
| Maximum Core Index, $\Delta_{1max}$ (%) | 0.336 | 0.336 | 0.336 | 0.336 |
| Core Radius, $r_1$, microns | 4.2 | 4.2 | 4.2 | 4.2 |
| Core alpha | 12 | 12 | 12 | 12 |
| Inner Cladding Index, $\Delta_2$ (%) | 0 | 0 | 0 | 0 |
| Inner Cladding Radius, $r_2$ (microns) | 7.16 | 7.16 | 7.16 | 7.16 |
| First Depressed-Index Cladding Shape | Triangular | Triangular | Triangular | Triangular |
| First Depressed-Index Cladding Minimum Index, $\Delta_{3, min}$ (%) | −0.5 | −0.5 | −0.5 | −0.5 |
| First Depressed-Index Cladding Outer Radius, $r_3$ (micron) | 15.9 | 15.9 | 15.9 | 15.9 |
| Volume of First Depressed-Index Cladding Region, $V_3$, %Δ micron$^2$ | −56.9 | −56.9 | −56.9 | −56.9 |
| Intermediate Cladding Index, $\Delta_4$ (%) | 0 | 0 | 0 | 0 |
| Intermediate Cladding Radius, $r_4$ (microns) | 20.2 | 20.2 | 20.2 | 20.2 |
| Second Depressed-Index Cladding Shape | Triangular | Triangular | Triangular | Triangular |
| Second Depressed-Index Cladding Minimum Index, $\Delta_{5, min}$ (%) | −0.072 | −0.11 | −0.145 | −0.18 |
| Second Depressed-Index Cladding Outer Radius, $r_5$ (micron) | 24.8 | 24.8 | 24.8 | 24.8 |
| Volume of Second Depressed-Index Cladding Region, $V_5$, %Δ micron$^2$ | −7.74 | −11.82 | −15.58 | −19.34 |
| Outer Cladding Index, $\Delta_6$ (%) | 0 | 0 | 0 | 0 |
| Outer Cladding Radius, $r_6$, microns | 62.5 | 62.5 | 62.5 | 62.5 |
| Ratio of $V_5/V_3$ | 0.136 | 0.208 | 0.274 | 0.340 |
| Center of Mass Radial Position of First Depressed-Index Cladding Region (microns) | 13.32 | 13.32 | 13.32 | 13.32 |
| Center of Mass Radial Position of Second Depressed-Index Cladding Region (microns) | 23.32 | 23.32 | 23.32 | 23.32 |
| Ratio of Center of Mass Radial Position of First and Second Depressed-Index Regions | 0.57 | 0.57 | 0.57 | 0.57 |
| Mode Field Diameter (micron) at 1310 nm | 9.08 | 9.08 | 9.08 | 9.08 |

TABLE 4-continued

|  | Ex12 | Ex13 | Ex14 | Ex15 |
|---|---|---|---|---|
| Effective Area at 1310 nm (micron²) | 64.5 | 64.5 | 64.5 | 64.5 |
| Zero Dispersion Wavelength (nm) | 1314 | 1314 | 1314 | 1314 |
| Dispersion at 1310 nm (ps/nm/km) | −0.344 | −0.332 | −0.324 | −0.34 |
| Dispersion Slope at 1310 nm (ps/nm2/km) | 0.086 | 0.083 | 0.081 | 0.085 |
| Mode Field Diameter (micron) at 1550 nm | 10.21 | 10.21 | 10.21 | 10.21 |
| Effective Area at 1550 nm (micron²) | 79.78 | 79.78 | 79.78 | 79.78 |
| Dispersion at 1550 nm (ps/nm/km) | 18.32 | 18.32 | 18.32 | 18.32 |
| Dispersion Slope at 1550 nm (ps/nm2/km) | 0.064 | 0.064 | 0.064 | 0.064 |
| Cable Cutoff (nm) | 1226 | 1226 | 1227 | 1228 |
| Bend Loss for 15 mm mandrel diameter at 1550 nm (dB/turn) | 0.11 | 0.118 | 0.1254 | 0.117 |
| Bend Loss for 20 mm mandrel diameter at 1550 nm (dB/turn) | 0.048 | 0.031 | 0.021 | 0.015 |
| Bend Loss for 30 mm mandrel diameter at 1550 nm (dB/turn) | 0.0024 | 0.0018 | 0.0014 | 0.001 |

Table 5 below provides five exemplary embodiments (Ex 16-20) and a comparative example (C2). Exemplary embodiments Ex 16-20 are shown in FIGS. 21-25. Exemplary embodiments Ex 16-20 all have a dual trench design with two rectangular shaped depressed-index cladding regions, a peak core refractive index ($\Delta 1_{max}$) of 0.37%, and a core alpha of 2.2. Although comparative example C2, which only has a single depressed-index cladding region, has a similar mode field diameter of exemplary embodiments Ex 16-20, comparative example C2 does not meet the G.657 standards across all bend diameters. More specifically, comparative example C2 does not meet the 30 mm bend loss standards.

TABLE 5

|  | C2 | Ex16 | Ex17 | Ex18 | Ex19 | Ex20 |
|---|---|---|---|---|---|---|
| Maximum Core Index, $\Delta_{1max}$ (%) | 0.37 | 0.37 | 0.37 | 0.37 | 0.37 | 0.37 |
| Core Radius, $r_1$, microns | 5.3 | 5.3 | 5.3 | 5.3 | 5.3 | 5.3 |
| Core alpha | 2.2 | 2.2 | 2.2 | 2.2 | 2.2 | 2.2 |
| Inner Cladding Index, $\Delta_2$ (%) | 0 | 0 | 0 | 0 | 0 | 0 |
| Inner Cladding Radius, $r_2$ (microns) | 10.56 | 10.56 | 10.56 | 10.56 | 10.56 | 10.56 |
| First Depressed-Index Cladding Shape | Rectangular | Rectangular | Rectangular | Rectangular | Rectangular | Rectangular |
| First Depressed-Index Cladding Minimum Index, $\Delta_{3,min}$ (%) | −0.5 | −0.5 | −0.5 | −0.5 | −0.5 | −0.5 |
| First Depressed-Index Cladding Outer Radius, $r_3$ (micron) | 14.6 | 14.6 | 14.6 | 14.6 | 14.6 | 14.6 |
| Volume of First Depressed-Index Cladding Region, $V_3$, %Δ micron² | −50.82 | −50.82 | −50.82 | −50.82 | −50.82 | −50.82 |
| Intermediate Cladding Index, $\Delta_4$ (%) | 0 | 0 | 0 | 0 | 0 | 0 |
| Intermediate Cladding Radius, $r_4$ (microns) | NA | 20.2 | 20.2 | 20.2 | 20.2 | 20.2 |
| Second Depressed-Index Cladding Shape | NA | Rectangular | Rectangular | Rectangular | Rectangular | Rectangular |
| Second Depressed-Index Cladding Minimum Index, $\Delta_{5,min}$ (%) | NA | −0.04 | −0.06 | −0.08 | −0.1 | −0.12 |
| Second Depressed-Index Cladding Outer Radius, $r_5$ (micron) | NA | 24.9 | 24.9 | 24.9 | 24.9 | 24.9 |
| Volume of Second Depressed-Index Cladding Region, $V_5$, %Δ micron² | 0 | −8.48 | −12.72 | −16.96 | −21.20 | −25.44 |

TABLE 5-continued

| | C2 | Ex16 | Ex17 | Ex18 | Ex19 | Ex20 |
|---|---|---|---|---|---|---|
| Outer Cladding Index, $\Delta_6$ (%) | 0 | 0 | 0 | 0 | 0 | 0 |
| Outer Cladding Radius, $r_6$, microns | 62.5 | 62.5 | 62.5 | 62.5 | 62.5 | 62.5 |
| Ratio of $V_5/V_3$ | 0.000 | 0.167 | 0.250 | 0.334 | 0.417 | 0.501 |
| Center of Mass Radial Position of First Depressed-Index Cladding Region (microns) | 12.69 | 12.69 | 12.69 | 12.69 | 12.69 | 12.69 |
| Center of Mass Radial Position of Second Depressed-Index Cladding Region (microns) | NA | 22.63 | 22.63 | 22.63 | 22.63 | 22.63 |
| Ratio of Center of Mass Radial Position of First and Second Depressed-Index Regions | NA | 0.56 | 0.56 | 0.56 | 0.56 | 0.56 |
| Mode Field Diameter (micron) at 1310 nm | 9.26 | 9.27 | 9.27 | 9.27 | 9.27 | 9.27 |
| Effective Area at 1310 nm (micron$^2$) | 65.29 | 65.36 | 65.36 | 65.36 | 65.36 | 65.36 |
| Zero Dispersion Wavelength (nm) | 1318 | 1318 | 1318 | 1318 | 1318 | 1318 |
| Dispersion at 1310 nm (ps/nm/km) | −0.736 | −0.68 | −0.656 | −0.664 | −0.632 | −0.624 |
| Dispersion Slope at 1310 nm (ps/nm2/km) | 0.092 | 0.085 | 0.082 | 0.083 | 0.079 | 0.078 |
| Mode Field Diameter (micron) at 1550 nm | 10.45 | 10.46 | 10.46 | 10.46 | 10.46 | 10.46 |
| Effective Area at 1550 nm (micron$^2$) | 82.43 | 82.48 | 82.48 | 82.48 | 82.48 | 82.48 |
| Dispersion at 1550 nm (ps/nm/km) | 18.35 | 18.38 | 18.38 | 18.38 | 18.38 | 18.38 |
| Dispersion Slope at 1550 nm (ps/nm2/km) | 0.066 | 0.065 | 0.065 | 0.065 | 0.065 | 0.065 |
| Cable Cutoff (nm) | 1200 | 1201 | 1202 | 1202 | 1203 | 1203 |
| Bend Loss for 15 mm mandrel diameter at 1550 nm (dB/turn) | 0.138 | 0.187 | 0.168 | 0.1245 | 0.084 | 0.0558 |
| Bend Loss for 20 mm mandrel diameter at 1550 nm (dB/turn) | 0.082 | 0.025 | 0.0152 | 0.0098 | 0.0066 | 0.0047 |
| Bend Loss for 30 mm mandrel diameter at 1550 nm (dB/turn) | 0.012 | 0.0055 | 0.0039 | 0.0028 | 0.002 | 0.0016 |

Table 6 below provides four exemplary embodiments (Ex 21-24) and a comparative example (C3). Exemplary embodiments Ex 21-24 are shown in FIGS. 26-29. Exemplary embodiments Ex 21-24 all have a dual trench design with both rectangular and triangular shaped depressed-index cladding regions, a peak core refractive index ($\Delta 1_{max}$) of 0.37%, and a core alpha of 2.2. Although comparative example C3, which only has a single depressed-index cladding region, has the same mode field diameter of exemplary embodiments Ex 21-24, comparative example C3 does not meet the G.657 standards across all bend diameters. More specifically, comparative example C3 does not meet the 30 mm bend loss standards.

TABLE 6

| | C3 | Ex21 | Ex22 | Ex23 | Ex24 |
|---|---|---|---|---|---|
| Maximum Core Index, $\Delta_{1max}$ (%) | 0.37 | 0.37 | 0.37 | 0.37 | 0.37 |
| Core Radius, $r_1$, microns | 5.3 | 5.3 | 5.3 | 5.3 | 5.3 |

TABLE 6-continued

| | C3 | Ex21 | Ex22 | Ex23 | Ex24 |
|---|---|---|---|---|---|
| Core alpha | 2.2 | 2.2 | 2.2 | 2.2 | 2.2 |
| Inner Cladding Index, $\Delta_2$ (%) | 0 | 0 | 0 | 0 | 0 |
| Inner Cladding Radius, $r_2$ (microns) | 7.45 | 7.45 | 7.45 | 7.45 | 7.45 |
| First Depressed-Index Cladding Shape | Triangular | Triangular | Triangular | Triangular | Triangular |
| First Depressed-Index Cladding Minimum Index, $\Delta_{3,min}$ (%) | −0.55 | −0.55 | −0.55 | −0.55 | −0.55 |
| First Depressed-Index Cladding Outer Radius, $r_3$ (micron) | 14.9 | 14.9 | 14.9 | 14.9 | 14.9 |
| Volume of First Depressed-Index Cladding Region, $V_3$, %Δ micron$^2$ | −50.94 | −50.94 | −50.94 | −50.94 | −50.94 |
| Intermediate Cladding Index, $\Delta_4$ (%) | 0 | 0 | 0 | 0 | 0 |
| Intermediate Cladding Radius, $r_4$ (microns) | NA | 20.2 | 20.2 | 20.2 | 20.2 |
| Second Depressed-Index Cladding Shape | NA | Rectangular | Rectangular | Rectangular | Rectangular |
| Second Depressed-Index Cladding Minimum Index, $\Delta_{5,min}$ (%) | NA | −0.04 | −0.06 | −0.08 | −0.1 |
| Second Depressed-Index Cladding Outer Radius, $r_5$ (micron) | NA | 24.9 | 24.9 | 24.9 | 24.9 |
| Volume of Second Depressed-Index Cladding Region, $V_5$, %Δ micron$^2$ | 0 | −8.48 | −12.72 | −16.96 | −21.20 |
| Outer Cladding Index, $\Delta_6$ (%) | 0 | 0 | 0 | 0 | 0 |
| Outer Cladding Radius, $r_6$, microns | 62.5 | 62.5 | 62.5 | 62.5 | 62.5 |
| Ratio of $V_5/V_3$ | 0.000 | 0.166 | 0.250 | 0.333 | 0.416 |
| Center of Mass Radial Position of First Depressed-Index Cladding Region (microns) | 12.67 | 12.67 | 12.67 | 12.67 | 12.67 |
| Center of Mass Radial Position of Second Depressed-Index Cladding Region (microns) | NA | 22.63 | 22.63 | 22.63 | 22.63 |
| Ratio of Center of Mass Radial Position of First and Second Depressed-Index Regions | NA | 0.56 | 0.56 | 0.56 | 0.56 |
| Mode Field Diameter (micron) at 1310 nm | 9.06 | 9.06 | 9.06 | 9.06 | 9.06 |
| Effective Area at 1310 nm (micron$^2$) | 62.4 | 62.4 | 62.4 | 62.4 | 62.4 |
| Zero Dispersion Wavelength (nm) | 1319 | 1319 | 1319 | 1319 | 1319 |
| Dispersion at 1310 nm (ps/nm/km) | −0.837 | −0.837 | −0.828 | −0.837 | −0.837 |
| Dispersion Slope at 1310 nm (ps/nm2/km) | 0.093 | 0.093 | 0.092 | 0.093 | 0.093 |
| Mode Field Diameter (micron) at 1550 nm | 10.22 | 10.22 | 10.22 | 10.22 | 10.22 |
| Effective Area at 1550 nm (micron$^2$) | 78.69 | 78.67 | 78.67 | 78.67 | 78.67 |
| Dispersion at 1550 nm (ps/nm/km) | 18.27 | 18.26 | 18.26 | 18.26 | 18.26 |
| Dispersion Slope at 1550 nm (ps/nm2/km) | 0.065 | 0.065 | 0.065 | 0.065 | 0.065 |
| Cable Cutoff (nm) | 1204 | 1204 | 1205 | 1205 | 1205 |
| Bend Loss for 15 mm mandrel diameter at 1550 nm (dB/turn) | 0.123 | 0.1514 | 0.165 | 0.162 | 0.1375 |

TABLE 6-continued

|  | C3 | Ex21 | Ex22 | Ex23 | Ex24 |
|---|---|---|---|---|---|
| Bend Loss for 20 mm mandrel diameter at 1550 nm (dB/turn) | 0.113 | 0.0665 | 0.042 | 0.0267 | 0.0176 |
| Bend Loss for 30 mm mandrel diameter at 1550 nm (dB/turn) | 0.007 | 0.0033 | 0.0024 | 0.0018 | 0.0014 |

Table 7 below provides four exemplary embodiments (Ex 25-28), which are also shown in FIGS. 30-33. Exemplary embodiments Ex 25-28 all have a dual trench design with triangular shaped depressed-index cladding regions, a peak core refractive index ($\Delta1_{max}$) of 0.37%, and a core alpha of 2.2.

TABLE 7

|  | Ex25 | Ex26 | Ex27 | Ex28 |
|---|---|---|---|---|
| Maximum Core Index, $\Delta_{1max}$ (%) | 0.37 | 0.37 | 0.37 | 0.37 |
| Core Radius, $r_1$, microns | 5.3 | 5.3 | 5.3 | 5.3 |
| Core alpha | 2.2 | 2.2 | 2.2 | 2.2 |
| Inner Cladding Index, $\Delta_2$ (%) | 0 | 0 | 0 | 0 |
| Inner Cladding Radius, $r_2$ (microns) | 7.45 | 7.45 | 7.45 | 7.45 |
| First Depressed-Index Cladding Shape | Triangular | Triangular | Triangular | Triangular |
| First Depressed-Index Cladding Minimum Index, $\Delta_{3,min}$ (%) | −0.55 | −0.55 | −0.55 | −0.55 |
| First Depressed-Index Cladding Outer Radius, $r_3$ (micron) | 14.9 | 14.9 | 14.9 | 14.9 |
| Volume of First Depressed-Index Cladding Region, $V_3$, %Δ micron$^2$ | −50.94 | −50.94 | −50.94 | −50.94 |
| Intermediate Cladding Index, $\Delta_4$ (%) | 0 | 0 | 0 | 0 |
| Intermediate Cladding Radius, $r_4$ (microns) | 20.2 | 20.2 | 20.2 | 20.2 |
| Second Depressed-Index Cladding Shape | Triangular | Triangular | Triangular | Triangular |
| Second Depressed-Index Cladding Minimum Index, $\Delta_{5,min}$ (%) | −0.072 | −0.11 | −0.145 | −0.18 |
| Second Depressed-Index Cladding Outer Radius, $r_5$ (micron) | 24.9 | 24.9 | 24.9 | 24.9 |
| Volume of Second Depressed-Index Cladding Region, $V_5$, %Δ micron$^2$ | −7.74 | −11.82 | −15.58 | −19.34 |
| Outer Cladding Index, $\Delta_6$ (%) | 0 | 0 | 0 | 0 |
| Outer Cladding Radius, $r_6$, microns | 62.5 | 62.5 | 62.5 | 62.5 |
| Ratio of $V_5/V_3$ | 0.152 | 0.232 | 0.306 | 0.380 |

TABLE 7-continued

|  | Ex25 | Ex26 | Ex27 | Ex28 |
|---|---|---|---|---|
| Center of Mass Radial Position of First Depressed-Index Cladding Region (microns) | 12.67 | 12.67 | 12.67 | 12.67 |
| Center of Mass Radial Position of Second Depressed-Index Cladding Region (microns) | 23.32 | 23.32 | 23.32 | 23.32 |
| Ratio of Center of Mass Radial Position of First and Second Depressed-Index Regions | 0.543 | 0.543 | 0.543 | 0.543 |
| Mode Field Diameter (micron) at 1310 nm | 9.06 | 9.06 | 9.06 | 9.06 |
| Effective Area at 1310 nm (micron$^2$) | 62.4 | 62.4 | 62.4 | 62.4 |
| Zero Dispersion Wavelength (nm) | 1319 | 1319 | 1319 | 1319 |
| Dispersion at 1310 nm (ps/nm/km) | −0.837 | −0.837 | −0.837 | −0.837 |
| Dispersion Slope at 1310 nm (ps/nm2/km) | 0.093 | 0.093 | 0.093 | 0.093 |
| Mode Field Diameter (micron) at 1550 nm | 10.22 | 10.22 | 10.22 | 10.22 |
| Effective Area at 1550 nm (micron$^2$) | 78.67 | 78.67 | 78.67 | 78.67 |
| Dispersion at 1550 nm (ps/nm/km) | 18.26 | 18.26 | 18.26 | 18.26 |
| Dispersion Slope at 1550 nm (ps/nm2/km) | 0.065 | 0.065 | 0.065 | 0.065 |
| Cable Cutoff (nm) | 1204 | 1204 | 1204 | 1204 |
| Bend Loss for 15 mm mandrel diameter at 1550 nm (dB/turn) | 0.166 | 0.202 | 0.228 | 0.2268 |
| Bend Loss for 20 mm mandrel diameter at 1550 nm (dB/turn) | 0.079 | 0.051 | 0.034 | 0.0236 |
| Bend Loss for 30 mm mandrel diameter at 1550 nm (dB/turn) | 0.0036 | 0.0027 | 0.0021 | 0.0016 |

Table 8 below provides five additional exemplary embodiments (Ex 29-33), which are also shown in FIGS. 34-38. Exemplary embodiments Ex 29-33 all have a dual trench design with triangular and/or rectangular depressed-index cladding regions.

TABLE 8

|  | Ex29 | Ex30 | Ex31 | Ex32 | Ex33 |
|---|---|---|---|---|---|
| Maximum Core Index, $\Delta_{1max}$ (%) | 0.352 | 0.352 | 0.352 | 0.352 | 0.38 |
| Core Radius, $r_1$, microns | 4.425 | 4.425 | 4.5 | 4.5 | 5.6 |
| Core alpha | 20 | 20 | 20 | 20 | 2.2 |

TABLE 8-continued

| | Ex29 | Ex30 | Ex31 | Ex32 | Ex33 |
|---|---|---|---|---|---|
| Inner Cladding Index, $\Delta_2$ (%) | 0 | 0 | 0 | 0 | 0 |
| Inner Cladding Radius, $r_2$ (microns) | 10 | 10 | 11.5 | 11.7 | 8.9 |
| First Depressed-Index Cladding Shape | Triangular | Triangular | Rectangular | Rectangular | Rectangular |
| First Depressed-Index Cladding Minimum Index, $\Delta_{3,min}$ (%) | −0.4 | −0.3 | −0.3 | −0.1 | −0.1 |
| First Depressed-Index Cladding Outer Radius, $r_3$ (micron) | 17.1 | 17 | 17.6 | 17.6 | 15.6 |
| Volume of First Depressed-Index Cladding Region, $V_3$, %Δ micron$^2$ | 20.12 | 15.09 | 16.54 | 5.51 | 8.68 |
| Intermediate Cladding Index, $\Delta_4$ (%) | 0 | 0 | 0 | 0 | 0 |
| Intermediate Cladding Radius, r4 (microns) | 17.1 | 17 | 17.6 | 17.6 | 15.6 |
| Second Depressed-Index Cladding Shape | Triangular | Triangular | Rectangular | Rectangular | Rectangular |
| Second Depressed-Index Cladding Minimum Index, $\Delta_{5,min}$ (%) | −0.3 | −0.1 | −0.1 | −0.25 | −0.2 |
| Second Depressed-Index Outer Radius, $r_5$ (micron) | 20 | 20 | 20 | 20 | 18 |
| Volume of Second Depressed-Index Cladding Region, $V_5$, %Δ micron$^2$ | 17.24 | 5.75 | 8.33 | 20.82 | 6.14 |
| Outer Cladding Index, $\Delta_6$ (%) | 0 | 0 | 0 | 0 | 0 |
| Outer Cladding Radius, $r_6$, microns | 62.5 | 62.5 | 62.5 | 62.5 | 62.5 |
| Ratio of $V_5/V_3$ | 0.857 | 0.381 | 0.504 | 3.779 | 0.707 |
| Center of Mass Radial Position of First Depressed-Index Cladding Region (microns) | 12.73 | 12.73 | 12.95 | 12.95 | 11.04 |
| Center of Mass Radial Position of Second Depressed-Index Cladding Region (microns) | 19.04 | 19.04 | 18.93 | 18.93 | 17.55 |
| Ratio of Center of Mass Radial Position of First and Second Depressed-Index Regions | 0.669 | 0.669 | 0.684 | 0.684 | 0.629 |
| Mode Field Diameter (micron) at 1310 nm | 9 | 9 | 9.01 | 9.02 | 9.2 |
| Effective Area at 1310 nm (micron$^2$) | 64.23 | 64.26 | 64.32 | 64.38 | 64.5 |
| Zero Dispersion Wavelength (nm) | 1309.2 | 1308.8 | 1309.5 | 1310.7 | 1314.3 |
| Dispersion at 1310 nm (ps/nm/km) | 0.07 | 0.105 | 0.044 | −0.061 | −0.387 |
| Dispersion Slope at 1310 nm (ps/nm2/km) | −0.0877 | −0.0874 | −0.0872 | −0.0865 | −0.09 |
| Mode Field Diameter (micron) at 1550 nm | 10.13 | 10.15 | 10.16 | 10.2 | 10.44 |
| Effective Area at 1550 nm (micron$^2$) | 79.03 | 79.23 | 79.42 | 79.85 | 81.91 |
| Dispersion at 1550 nm (ps/nm/km) | 17.77 | 17.6 | 17.53 | 17.16 | 17.54 |
| Dispersion Slope at 1550 nm (ps/nm2/km) | 0.061 | 0.06 | 0.06 | 0.059 | 0.062 |
| Cable Cutoff (nm) | 1255 | 1215 | 1215 | 1217 | 1208 |
| Bend Loss for 15 mm mandrel diameter at 1550 nm (dB/turn) | 0.086 | 0.43 | 0.283 | 0.23 | 0.5 |

TABLE 8-continued

|  | Ex29 | Ex30 | Ex31 | Ex32 | Ex33 |
|---|---|---|---|---|---|
| Bend Loss for 20 mm mandrel diameter at 1550 nm (dB/turn) | 0.03 | 0.04 | 0.05 | 0.048 | 0.07 |
| Bend Loss for 30 mm mandrel diameter at 1550 nm (dB/turn) | 0.0006 | 0.0017 | 0.0014 | 0.0015 | 0.002 |

Table 9 below provides four additional exemplary embodiments (Ex 34-37), which are also shown in FIGS. 39-42. Exemplary embodiments Ex 34-37 all have a dual trench design with triangular and/or rectangular depressed-index cladding regions.

TABLE 9

|  | Ex34 | Ex35 | Ex36 | Ex37 |
|---|---|---|---|---|
| Maximum Core Index, $\Delta_{1max}$ (%) | 0.324 | 0.324 | 0.3265 | 0.3265 |
| Core Radius, $r_1$, microns | 4.36 | 4.36 | 4.382 | 4.382 |
| Core alpha | 20 | 20 | 20 | 20 |
| First Inner Cladding Index, $\Delta_2$ (%) | 0 | 0 | 0 | 0 |
| First Inner Cladding Radius, $r_2$ (microns) | 10 | 10 | 10 | 10 |
| First Depressed Cladding Shape | Triangular | Triangular | Triangular | Triangular |
| First Depressed Cladding Minimum Index, $\Delta_{3,min}$ (%) | −0.4 | −0.51 | −0.4 | −0.55 |
| First Depressed Cladding Outer Radius, $r_3$ (micron) | 14 | 14 | 14 | 14 |
| Volume of First Depressed Cladding Region, $V_3$, %Δ micron$^2$ | 20.122 | 25.66 | 20.12 | 27.67 |
| Second Inner Cladding Index, $\Delta_4$ (%) | 0 | 0 | 0 | 0 |
| Second Inner Cladding Radius, $r_4$ (microns) | 17 | 17 | 17 | 17 |
| Second Depressed Cladding Shape | Triangular | Triangular | Triangular | Triangular |
| Second Depressed Cladding Minimum Index, $\Delta_{5,min}$ (%) | −0.3 | −0.2 | −0.3 | −0.15 |
| Second Inner Cladding Outer Radius, $r_5$ (micron) | 20 | 20 | 20 | 20 |
| Volume of Second Depressed Cladding Region, $V_5$, %Δ micron$^2$ | 17.24 | 11.5 | 17.24 | 8.62 |
| Outer Cladding Index, $\Delta_6$ (%) | 0 | 0 | 0 | 0 |
| Outer Cladding Radius, $R_6$, microns | 62.5 | 62.5 | 62.5 | 62.5 |
| Ratio of $V_5/V_3$ | 0.857 | 0.448 | 0.857 | 0.312 |
| Center of Mass Radial Position of First Depressed Cladding Region (microns) | 12.73 | 12.73 | 12.73 | 12.73 |
| Center of Mass Radial Position of Second Depressed Cladding Region (microns) | 19.04 | 19.04 | 19.04 | 19.04 |
| Ratio of Center of Mass Radial Position of First and Second Depressed Regions | 0.669 | 0.669 | 0.669 | 0.669 |
| Mode Field Diameter (micron) at 1310 nm | 9.21 | 9.2 | 9.2 | 9.19 |
| Effective Area at 1310 nm (micron$^2$) | 66.54 | 66.48 | 66.51 | 66.44 |
| Zero Dispersion Wavelength (nm) | 1312 | 1311 | 1312 | 1311 |
| Dispersion at 1310 nm (ps/nm/km) | −0.176 | −0.088 | −0.176 | −0.0884 |
| Dispersion Slope at 1310 nm (ps/nm2/km) | 0.088 | 0.0883 | 0.088 | 0.0884 |
| Mode Field Diameter (micron) at 1550 nm | 10.43 | 10.41 | 10.41 | 10.38 |
| Effective Area at 1550 nm (micron$^2$) | 83.14 | 82.87 | 82.87 | 82.53 |
| Dispersion at 1550 nm (ps/nm/km) | 17.52 | 17.7 | 17.59 | 17.83 |
| Dispersion Slope at 1550 nm (ps/nm2/km) | 0.062 | 0.062 | 0.062 | 0.062 |
| Cable Cutoff (nm) | 1211 | 1211 | 1218 | 1220 |
| Bend Loss for 15 mm mandrel diameter at 1550 nm (dB/turn) | 0.464 | 0.462 | 0.428 | 0.484 |
| Bend Loss for 20 mm mandrel diameter at 1550 nm (dB/turn) | 0.052 | 0.066 | 0.0433 | 0.057 |
| Bend Loss for 30 mm mandrel diameter at 1550 nm (dB/turn) | 0.005 | 0.006 | 0.003 | 0.004 |

Exemplary Methods

The optical fibers disclosed herein, with the dual trench designs, can be made using well-known and conventional methods of making optical fiber. In other embodiments, the refractive index profiles comprising rectangular trenches are made using OVD or VAD processes involving unique steps. In these embodiments, the core region and the inner cladding region are deposited as soot to make a soot core preform, which is then subsequently moved to a consolidation furnace where it is treated with a dehydration agent and sintered into a void free fully densified core glass preform. The process to make the core glass preform also includes redrawing the soot core preform into daughter core canes. A silica soot layer is then put on the daughter core canes such that a thickness of the silica soot layer corresponds to a thickness of the first depressed-index cladding region in the optical fiber profile. The silica soot layer is then dehydrated, doped with fluorine, and sintered into a fully densified glass layer in the consolidation furnace.

Similarly, the intermediate cladding region, the second depressed-index cladding region, and the outer cladding region are deposited on the daughter core canes and consolidated to fully densified glass layers to complete the refractive index profile of the dual trench optical fibers disclosed here. Making of the second depressed-index cladding region is again achieved using fluorine doping in the consolidation furnace during processing of the second depressed-index cladding region.

In other embodiments, the refractive index profiles comprising triangular trenches can be made using a reduced number of steps compared to the rectangular trenches. In these embodiments, the core region, the inner cladding region, and the first depressed-index cladding region are made in a single step. A germania doped core region with surrounding silica layer, which corresponds to a thickness of the inner cladding region and the first depressed-index cladding region, are deposited in laydown in a single step to produce a soot core preform. The soot core preform is then transferred to a consolidation furnace where it is treated with a dehydration agent, doped with fluorine, and consolidated into a void free fully densified glass preform.

In some embodiments, the fluorine doping of the soot core preform is performed under conditions where the fluorine doping is diffusion limited and is limited to a region corresponding to a depressed-index cladding region that is triangular in shape. In these embodiments, the fluorine doping is performed at a temperature greater than about 1275° C., or greater than about 1300° C., or greater than about 1325° C., or greater than about 1350° C., or less than about 1375° C. Furthermore, in these embodiments, the soot core preform is further processed by deposition of a silica soot layer that provides a soot thickness corresponding to a combined thickness of the intermediate cladding region and the second depressed-index cladding region. The soot core preform with the silica soot layer is then transferred to a consolidation furnace and treated with a dehydration agent, doped with fluorine, and sintered into a fully densified glass layer in the consolidation furnace, wherein the fluorine doping is performed at doping temperatures greater than about 1275° C. to form the triangular depressed-index cladding region. A soot layer corresponding to the outer cladding region is then deposited on the soot core preform (which comprises the dual trench profile) and then transferred to a consolidated furnace, where it is sintered into a void free fully densified glass layer to form the optical fiber preform. The optical fiber preform is then drawn into an optical fiber, which may be used in telecommunication systems.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A single mode optical fiber comprising:
a core region having an outer radius $r_1$ and a maximum relative refractive index $\Delta 1_{max}$,
wherein the single mode optical fiber has a bend loss at 1550 nm for a 15 mm diameter mandrel of less than about 0.75 dB/turn, has a bend loss at 1550 nm for a 20 mm diameter mandrel of less than about 0.2 dB/turn, and a bend loss at 1550 nm for a 30 mm diameter mandrel of less than about 0.0018 dB/turn, and
wherein the single mode optical fiber has a mode field diameter of about 9.0 microns or greater at 1310 nm wavelength and a cable cutoff of less than or equal to about 1260 nm.

2. The single mode optical fiber of claim 1, wherein the mode field diameter is about 9.1 microns or greater.

3. The single mode optical fiber of claim 2, wherein the mode field diameter is about 9.2 microns or greater.

4. The single mode optical fiber of claim 1, wherein the mode field diameter is less than about 9.6 microns.

5. The single mode optical fiber of claim 1, wherein the optical fiber cable has zero dispersion wavelength between about 1300 nm and about 1324 nm.

6. The single mode optical fiber of claim 1, wherein the bend loss at 1550 nm for a 15 mm diameter mandrel is less than about 0.5 dB/turn.

7. The single mode optical fiber of claim 6, wherein the bend loss at 1550 nm for a 15 mm diameter mandrel is less than about 0.25 dB/turn.

8. The single mode optical fiber of claim 1, wherein the bend loss at 1550 nm for a 20 mm diameter mandrel is less than about 0.15 dB/turn.

9. The single mode optical fiber of claim 8, wherein the bend loss at 1550 nm for a 20 mm diameter mandrel is less than about 0.1 dB/turn.

10. The single mode optical fiber of claim 1, wherein the bend loss at 1550 nm for a 30 mm diameter mandrel is less than about 0.0013 dB/turn.

11. The single mode optical fiber of claim 1, wherein the core region has an alpha value of less than or equal to about 5.

12. The single mode optical fiber of claim 1, wherein the core region has an alpha value of greater than or equal to about 10.

13. The single mode optical fiber of claim 1, wherein the optical fiber has an attenuation at 1550 nm of about 0.19 dB/km or less.

14. A single mode optical fiber comprising:
a core region having an outer radius $r_1$ and a maximum relative refractive index $\Delta 1_{max}$; and a cladding region surrounding the core, the cladding region comprising:
  an inner cladding region having an outer radius $r_2$ and a relative refractive index $\Delta_2$,
  a first depressed-index cladding region surrounding the inner cladding region, the first depressed-index cladding region having an outer radius $r_3$, a minimum relative refractive index $\Delta_{3min}$, and a trench volume $V_3$,
  an intermediate cladding region surrounding the first depressed-index cladding region, the intermediate cladding region having an outer radius $r_4$ and a relative refractive index $\Delta_4$,
  a second depressed-index cladding region surrounding the intermediate cladding region, the second depressed-index cladding region having an outer radius $r_5$, a minimum relative refractive index $\Delta_{5min}$, and a trench volume $V_5$, and
  an outer cladding region surrounding the second depressed-index cladding region, the outer cladding region having a relative refractive index $\Delta_6$,
  wherein the single mode optical fiber has a bend loss at 1550 nm for a 15 mm diameter mandrel of less than about 0.75 dB/turn, has a bend loss at 1550 nm for a 20 mm diameter mandrel of less than about 0.2 dB/turn, and a bend loss at 1550 nm for a 30 mm diameter mandrel of less than 0.005 dB/turn, and
  wherein the single mode optical fiber has a mode field diameter of about 9.0 microns or greater at 1310 nm wavelength.

15. The single mode optical fiber of claim 14, wherein:

$\Delta_{1max} > \Delta_2 > \Delta_{5min} > \Delta_{3min}$, and $\Delta_{1max} > \Delta_4 > \Delta_{5min} > \Delta_{3min}$.

16. The single mode optical fiber of claim 14, wherein the mode field diameter is about 9.1 microns or greater.

17. The single mode optical fiber of claim 14, wherein a ratio of $V_5/V_3$ is about 0.5 or less.

18. The single mode optical fiber of claim 14, wherein the single mode optical fiber has a cable cutoff of less than or equal to about 1260 nm.

* * * * *